(12) United States Patent
Kim et al.

(10) Patent No.: US 10,433,310 B2
(45) Date of Patent: Oct. 1, 2019

(54) VEHICLE, COMMUNICATION METHOD THEREOF, AND WIRELESS COMMUNICATION DEVICE THEREIN

(71) Applicant: HYUNDAI MOTOR COMPANY, Seoul (KR)

(72) Inventors: Sung Un Kim, Yongin-si (KR); Kyunghyun Kang, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/942,716

(22) Filed: Nov. 16, 2015

(65) Prior Publication Data

US 2016/0278065 A1    Sep. 22, 2016

(30) Foreign Application Priority Data

Mar. 19, 2015  (KR) .......................... 10-2015-0038475

(51) Int. Cl.
| | |
|---|---|
| *H04W 72/04* | (2009.01) |
| *H04W 16/28* | (2009.01) |
| *G07C 5/08* | (2006.01) |
| *H04B 7/06* | (2006.01) |
| *G08G 1/0967* | (2006.01) |
| *G08G 1/16* | (2006.01) |

(52) U.S. Cl.
CPC ........ *H04W 72/046* (2013.01); *G07C 5/0808* (2013.01); *G07C 5/0816* (2013.01); *G08G 1/096716* (2013.01); *G08G 1/096775* (2013.01); *G08G 1/096791* (2013.01); *G08G 1/162* (2013.01); *G08G 1/163* (2013.01); *H04B 7/0617* (2013.01); *H04W 16/28* (2013.01)

(58) Field of Classification Search
None
See application file for complete search history.

(56) References Cited

U.S. PATENT DOCUMENTS

| | | | |
|---|---|---|---|
| 2005/0164664 A1* | 7/2005 | DiFonzo | ................. H04L 45/00 455/277.1 |
| 2005/0225457 A1 | 10/2005 | Kagawa | |
| 2010/0019932 A1 | 1/2010 | Goodwin | |

(Continued)

FOREIGN PATENT DOCUMENTS

| | | |
|---|---|---|
| JP | 2005-84790 A | 3/2005 |
| JP | 2012-48645 A | 3/2012 |

(Continued)

OTHER PUBLICATIONS

Final Office Action U.S. Appl. No. 14/942,514 dated Mar. 9, 2017.

(Continued)

*Primary Examiner* — Ernest G Tacsik
(74) *Attorney, Agent, or Firm* — Morgan, Lewis & Bockius LLP

(57) ABSTRACT

A vehicle includes a wireless communication unit configured to form a beam pattern for performing wireless communication with a target vehicle, a camera module configured to obtain an image of at least one peripheral vehicle, and a display unit configured to display the image. When the target vehicle is selected based on the displayed image, the beam pattern is formed toward the selected target vehicle.

19 Claims, 46 Drawing Sheets

(56) References Cited

U.S. PATENT DOCUMENTS

| | | | |
|---|---|---|---|
| 2011/0251768 A1* | 10/2011 | Luo | B60W 30/12 701/70 |
| 2013/0070677 A1* | 3/2013 | Chang | G01S 13/9303 370/328 |
| 2013/0086164 A1 | 4/2013 | Wheeler et al. | |
| 2013/0124012 A1* | 5/2013 | Shida | G08G 1/0104 701/2 |
| 2013/0261869 A1* | 10/2013 | Brenneis | B60W 50/0205 701/23 |
| 2013/0268186 A1* | 10/2013 | Yamashiro | G06F 17/00 701/300 |
| 2014/0085538 A1* | 3/2014 | Kaine | H04N 9/802 348/462 |
| 2014/0176350 A1 | 6/2014 | Niehsen et al. | |
| 2015/0254982 A1* | 9/2015 | Goudy | G08G 1/165 340/435 |

FOREIGN PATENT DOCUMENTS

| | | |
|---|---|---|
| JP | 2004-199348 A | 7/2014 |
| JP | 2014-164316 A | 9/2014 |
| KR | 10-2010-0107800 A | 10/2010 |
| KR | 10-2011-0014806 A | 2/2011 |
| KR | 10-2011-0071494 A | 6/2011 |
| KR | 10-2012-0061313 A | 6/2012 |
| KR | 10-2013-0017932 A | 2/2013 |
| KR | 10-2013-0114404 A | 10/2013 |
| KR | 10-2014-0024930 A | 3/2014 |
| KR | 10-2014-0031369 A | 3/2014 |

OTHER PUBLICATIONS

Office Action dated Sep. 2, 2016 issued in U.S. Appl. No. 14/942,514.
U.S. Final Office Action dated Apr. 17, 2018 issued in U.S. Appl. No. 14/942,514.
U.S. Non-Final Office Action dated Oct. 4, 2017 issued in U.S. Appl. No. 14/942,514.

* cited by examiner

VEHICLE, COMMUNICATION METHOD THEREOF, AND WIRELESS COMMUNICATION DEVICE THEREIN

CROSS-REFERENCE TO RELATED APPLICATION

This application claims the benefit of priority to Korean Patent Application No. 10-2015-0038475, filed on Mar. 19, 2015 in the Korean Intellectual Property Office, the disclosure of which is incorporated herein by reference.

TECHNICAL FIELD

Embodiments of the present invention relate to a vehicle, a communication method thereof, and a wireless communication device therein, and more particularly, to a vehicle capable of communicating between vehicles, a communication method thereof, and a wireless communication device therein.

BACKGROUND

In general, vehicles mean transportation apparatuses driving on roads or tracks using fossil fuels or electricity as power sources.

In addition to a function that the vehicle transports goods and a person, the vehicle generally includes an audio device and a video device so that a driver is able to listen to music and view an image while driving. A navigation device displaying a path to a destination desired by the driver is also widely installed therein.

Recently, a necessity that the vehicle communicates with an external device has been gradually increased.

For example, in a navigation function of guiding on a route to a destination, information on traffic conditions is required in order to search for an optimum route. Since the traffic conditions are variable, the vehicle may need to obtain the information on the traffic conditions in real time.

SUMMARY

It is an aspect of the present invention to provide a vehicle including a wireless communication device for communicating with a peripheral vehicle, an external terminal, or a wireless communication base station, and a method of controlling the same.

Additional aspects of the invention will be set forth in part in the description which follows and, in part, will be obvious from the description, or may be learned by practice of the invention.

In accordance with one aspect of the present invention, a vehicle includes: a wireless communication unit configured to form a beam pattern for performing wireless communication with a target vehicle; a camera module configured to obtain an image of at least one peripheral vehicle; and a display unit configured to display the obtained image. When the target vehicle is selected from the at least one peripheral vehicle based on the displayed image, the beam pattern is formed toward the selected target vehicle.

The wireless communication unit may include: a beam forming module configured to form the beam pattern, and transceive a wireless signal through a radio wave of the beam pattern; and a wireless communication control module configured to control the formation of the beam pattern according to a position of the target vehicle.

The beam forming module may include: a plurality of phase converters configured to convert a phase of a modulation signal received from a signal conversion module; and an array antenna including a plurality of unit antennas and configured to transmit signals received from the plurality of phase converters to a free space.

The wireless communication control module may determine a main direction of the beam pattern according to the position of the target vehicle, and determine a phase difference between the plurality of phase converters according to the determined main direction.

The display unit may include a touch sensing display unit configured to detect a touch input of a driver, and the target vehicle may be selected according to the touch input of the driver.

The vehicle may further include a gaze detection device configured to detect a gaze of a driver. The target vehicle is selected according to the detected gaze of the driver.

The vehicle may further include an engine control system configured to control an operation of an engine, and detect a malfunction in the engine. The wireless communication unit transmits information on the malfunction in the engine received from the engine control system to the target vehicle through a radio wave of the beam pattern.

The vehicle may further include a brake control apparatus configured to control a brake and detect a malfunction in the brake. The wireless communication unit transmits information on the malfunction in the brake received from the brake control apparatus to the target vehicle through a radio wave of the beam pattern.

The vehicle may further include a driving subsystem configured to assist a driver with driving. The wireless communication unit transmits information on road conditions received from the driving subsystem to the target vehicle through a radio wave of the beam pattern.

In accordance with another aspect of the present invention, a vehicle, comprising: a wireless communication unit configured to form a beam pattern for performing wireless communication with a target vehicle; a radar module configured to obtain position information of at least one peripheral vehicle; and a display unit configured to display the position information. When the target vehicle is selected from the at least one peripheral vehicle based on the position information, the beam pattern is formed toward the selected target vehicle.

The wireless communication unit may include: a beam forming module configured to form the beam pattern, and transceive a wireless signal through a radio wave of the beam pattern; and a wireless communication control module configured to control the formation of the beam pattern according to a position of the target vehicle.

The beam forming module may include: a plurality of phase converters configured to convert a phase of a modulation signal received from a signal conversion module; and an array antenna including a plurality of unit antennas and configured to transmit signals received from the plurality of phase converters to a free space.

The wireless communication control module may determine a main direction of the beam pattern according to the position of the target vehicle, and determine a phase difference between the plurality of phase converters according to the determined main direction.

The display unit may include a touch sensing display unit configured to detect a touch input of a driver, and the target vehicle may be selected according to the touch input of the driver.

The vehicle may further include a gaze detection device configured to detect a gaze of a driver. The target vehicle is selected according to the detected gaze of the driver.

In accordance with still another aspect of the present invention, a communication method of a vehicle, includes: receiving a driver's selection of a target vehicle; forming a beam pattern toward the target vehicle; and communicating with the target vehicle through a radio wave of the beam pattern.

The receiving of the driver's selection of the target vehicle may include: obtaining an image of at least one peripheral vehicle; displaying the obtained image; and determining the target vehicle from the at least one peripheral vehicle based on the selection of the driver and the displayed image.

The receiving of the driver's selection of the target vehicle may include: obtaining position information of the at least one peripheral vehicle; displaying an image representing the position information of the at least one peripheral vehicle; and determining the target vehicle from the at least one peripheral vehicle based on the selection of the driver and the displayed image.

The forming of the beam pattern toward the target vehicle may include: determining a main direction of the beam pattern according to the position information of the target vehicle; determining phase differences of wireless signals transmitted through a plurality of unit antennas based on the determined main direction; and transmitting the wireless signals through the plurality of unit antennas according to the determined phase differences.

In accordance with yet another aspect of the present invention, a wireless communication device of a vehicle, includes: an internal communication unit configured to access a communication network of the vehicle; a wireless communication unit configured to form a beam pattern and communicate with an external device through a radio wave of the beam pattern; and a communication controller configured to control the wireless communication unit to form the beam pattern toward a target vehicle when an information transmission request and position information of the target vehicle through the internal communication unit are received.

The wireless communication unit may include: a beam forming module configured to form the beam pattern, and transceive a wireless signal through the radio wave of the beam pattern; a signal conversion module configured to demodulate the wireless signal received through the beam forming module, and modulate a signal transmitted through the beam forming module; and a wireless communication control module configured to control the formation of the beam pattern according to a position of the target vehicle.

The beam forming module may include: a plurality of phase converters configured to convert a phase of the modulated signal received from the signal conversion module; and an array antenna including a plurality of unit antennas and configured to transmit signals received from the plurality of phase converters to a free space.

The wireless communication control module may determine a phase difference between the plurality of phase converters according to a main direction of the beam pattern.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Embodiments described in this specification and configurations shown in the accompanying drawings are merely preferred examples, and there may be various alternatives capable of replacing the embodiments and the configurations of the present invention at the time of this application.

Hereinafter, embodiments of the present invention will be described in detail with reference to the accompanying drawings.

Figure 1:
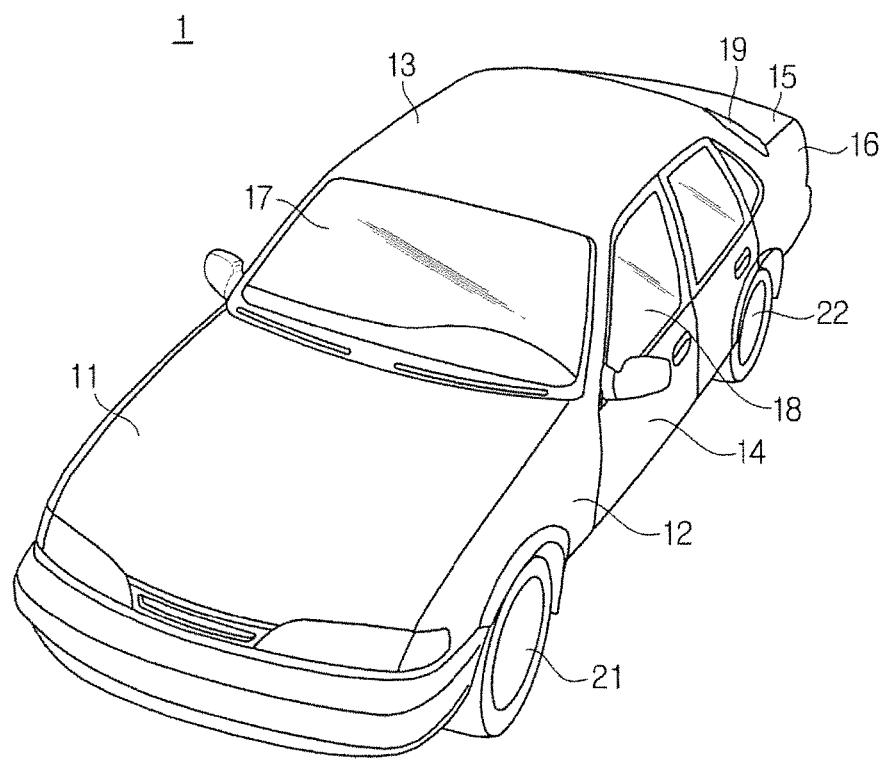
FIG. 1 is a diagram illustrating an appearance of a vehicle of an embodiment of the present invention.
Figure 2:
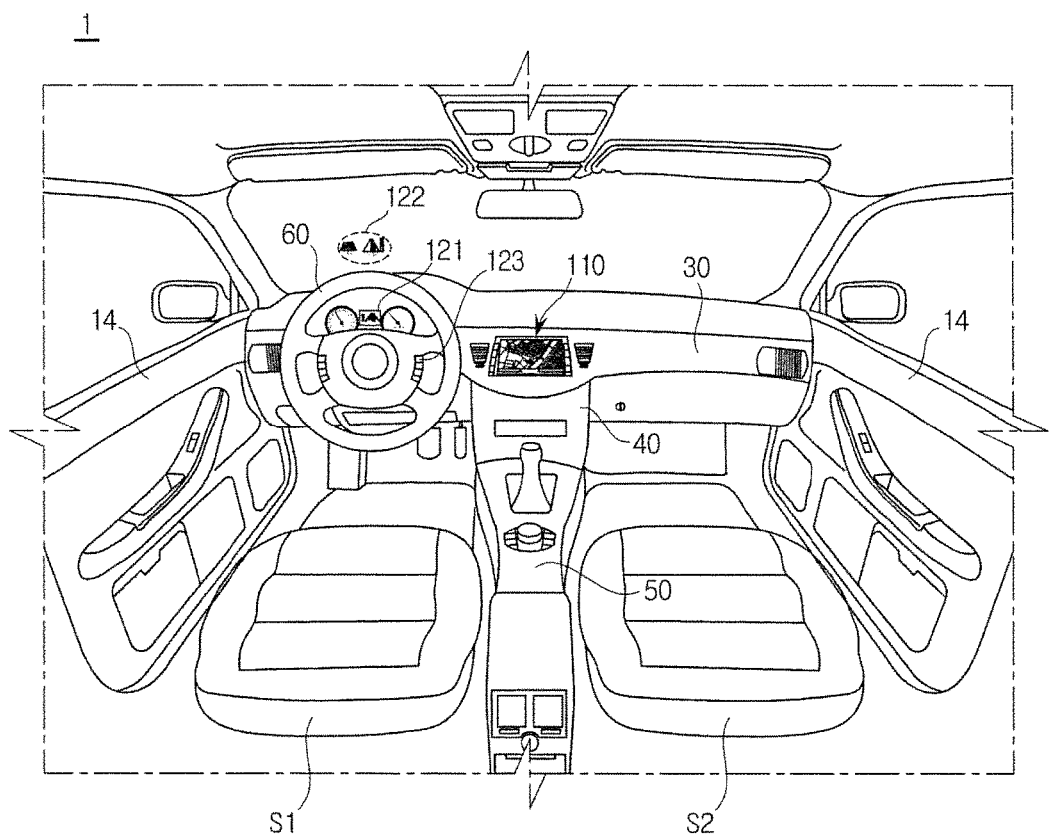
FIG. 2 is a diagram illustrating an inside of a vehicle according to an embodiment of the present invention.
Figure 3:
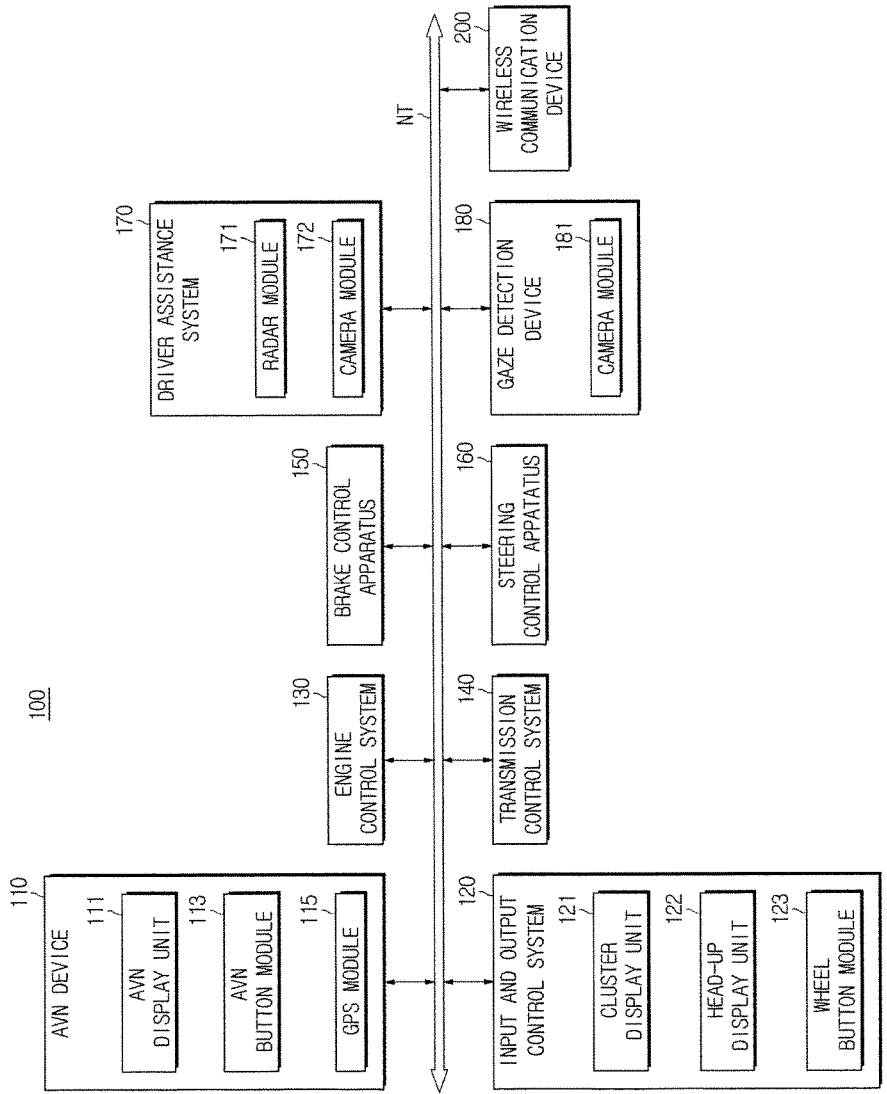
FIG. 3 is a diagram illustrating various kinds of electronic devices included in a vehicle according to an embodiment of the present invention.

FIG. 1 is a diagram illustrating an appearance of a vehicle of an embodiment of the present invention, FIG. 2 is a diagram illustrating an inside of a vehicle according to an embodiment of the present invention, and FIG. 3 is a diagram illustrating various kinds of electronic devices included in a vehicle according to an embodiment of the present invention.

As shown in FIG. 1, a vehicle 1 according to the embodiment may include a body 11 to 16 forming the appearance of the vehicle 1, a chassis (not shown) supporting components of the vehicle 1, and wheels 21 and 22 moving the body 11 to 16 and the chassis.

The wheels 21 and 22 may include a front wheel 21 provided in the front of the vehicle and a rear wheel 22 provided in the rear of the vehicle, and may move in a forward or backward direction through rotation of the wheels 21 and 22.

The body 11 to 16 may include a hood 11, a front fender 12, a roof panel 13, a door 14, a trunk lid 15, and a quarter panel 16, etc.

Further, a front window 17 installed toward the front of the body 11 to 16, a side window 18 installed in the door 14, and a rear window 19 installed toward the rear of the body 11 to 16 may be provided outside the body 11 to 16.

As shown in FIG. 2, the vehicle 1 may include seats S1 and S2 on which a passenger sits, a dash board 30 in which various instruments controlling an operation of the vehicle 1 and displaying driving information of the vehicle 1 are provided, a center fascia 40 in which a control panel controlling attached devices included in the vehicle 1 is provided, a center console 50 in which a gear stick and a parking brake stick are provided, and a steering wheel 60 controlling a driving direction of the vehicle 1 in the inside of the body 11 to 16.

The seats S1 and S2 may support a driver to operate the vehicle 1 in a comfortable and stable posture, and include a driver seat S1 on which the driver sits, a passenger seat S2 on the passenger sits, a rear seat (not shown) located toward the rear in the inside of the vehicle 1.

An instrument panel including a speedometer, a fuel gauge, an automatic transmission selection lever display light, a tachometer, an odometer, etc. which are disposed in the dash board 30 and display information on the driving may be provided.

The center fascia 40 may be provided between the driver seat S1 and the passenger seat S2, and a controller for controlling an audio device, an air conditioner, and a heater, an air-outlet grille of the air conditioner for controlling a temperature of the inside of the body 11 to 16, a cigarette jack, etc. may be provided therein.

The center console 50 may be provided between the driver seat S1 and the passenger seat S2 and below the center fascia 33, and a gear stick for transmission and a parking brake stick for parking, etc. may be provided therein.

The steering wheel 60 may be attached to the dash board 30 to be rotatable about a steering axis. The driver may rotate the steering wheel 60 clockwise or counter clockwise in order to change a driving direction of the vehicle 1.

A power generation apparatus (for example, an engine or a motor) generating power for moving the vehicle 1 by burning a fuel, a fuel supply apparatus for supplying the fuel to the power generation apparatus, a cooling apparatus for cooling a heated power generation apparatus, an exhaust system for discharging a gas generated by burning the fuel, a power transfer apparatus for transferring power generated by the power generation apparatus to the wheels 21 and 22, a steering apparatus for transferring the driving direction of the vehicle 1 controlled by the steering wheel 60 to the wheels 21 and 22, a brake apparatus for braking the rotation of the wheels 21 and 22, and a suspension apparatus for absorbing vibration of the wheels 21 and 22 due to a road, etc. may be provided in the chassis (not shown).

The vehicle 1 may include various electronic devices 100 together with the mechanical apparatuses described above.

As shown in FIG. 3, the vehicle 1 may include an audio/video/navigation (AVN) device 110, an input and output control system 120, an engine management system (EMS) 130, a transmission management system (TMS) 140, a brake control apparatus 150, a steering control apparatus 160, a driver assistance system 170, a gaze detection device 180, a wireless communication device 200, etc. The electronic device 100 shown in FIG. 3 may merely be a part of the electronic devices included in the vehicle 1, and more various electronic devices may be provided therein.

Further, the electronic device 100 included in the vehicle 1 may communicate through a vehicle communication network (NT). The NT may use communication protocols such as a media oriented systems transport (MOST) having a communication speed up to 24.5 mega-bits per second (Mbps), a FlexRay having a communication speed up to 10 Mbps, a controller area network (CAN) having a communication speed up to 125 kilo-bits per second (Kbps), a local interconnect network (LIN) having a communication speed up to 20 Kbps, etc. The NT may use not only a single communication protocol such as the MOST, the FlexRay, the CAN, the LIN, etc. but also a plurality of communication protocols.

The AVN device 110 may be a device outputting music or an image according to a control command of the driver. Specifically, the AVN device 110 may play the music or the video or guide on a route to a destination according to the control command of the driver.

The AVN device 110 may include an AVN display unit 111 for displaying an image for the driver, an AVN module for receiving the control command of the driver, and a global positioning system (GPS) module 115 for obtaining geographical position information of the vehicle 1. Here, the AVN display unit 111 may use a touch sensing display unit (for example, a touch screen) capable of receiving a touch input from the driver. Further, the AVN display unit 111 may use a liquid crystal display (LCD) panel, an organic light emitting diode (OLED) panel, etc.

Further, the GPS module 115 may receive information for calculating a position of the vehicle 1 from GPS satellites, and determine the position of the vehicle 1 based on the information received from the GPS satellites.

An input and output control system 120 may receive the control command of the driver through a button, and display information corresponding to the control command of the driver. The input and output control system 120 may include a cluster display unit 121 which is provided in the dash board 30 and displays an image, a head-up display unit 122 for projecting an image on a front window 17, and a wheel button module 123 installed in the steering wheel 60.

The cluster display unit 121 may be provided in the dash board 30, and display an image. Specifically, the cluster display unit 121 may allow the driver to obtain operational information of the vehicle 1, road information, a driving route, etc. in a state in which a driver's gaze is not significantly deviated from a front of the vehicle 1 by being provided to be adjacent to the front window 17. The cluster display unit 121 may be implemented by an LCD panel, an OLED panel, etc.

The head-up display unit 122 may project an image on the front window 17. The image projected on the front window 17 by the head-up display unit 122 may include the operational information of the vehicle 1, the road information, or the driving route, etc.

The engine control system 130 may perform a fuel injection control, a fuel efficiency control, a lean-burn control, an ignition time control, idle revolutions per minute (rpm) control, etc. The engine control system 130 may be not only a single apparatus, but also a plurality of apparatuses connected through communication.

The transmission control system 140 may perform a transmission point control, a damper clutch control, a pressure control when a friction clutch turns on or off, and an engine torque control while changing a speed. The transmission control system 140 may be not only a single apparatus, but also a plurality of apparatuses connected through communication.

The brake control apparatus 150 may control a brake of the vehicle 1, and may representatively include an anti-lock brake system (ABS). The steering control apparatus 160 may reduce a steering force while driving at low speed or parking, and assist a steering operation of the driver by increasing the steering force while driving at high speed.

The driver assistance system 170 may assist the driving of the vehicle 1, and perform a forward collision avoidance function, a lane departure warning function, a blind spot monitoring function, a rear monitoring function, etc.

The driver assistance system 170 may include a plurality of devices connected through the communication. For example, the driver assistance system 170 may include a forward collision warning (FCW) system for detecting a vehicle which is driven in the same direction in the front driving lane and avoiding a collision with a front vehicle, an advanced emergency braking system (AEBS) for alleviating a collision when the collision with the front vehicle is inevitable, an adaptive cruise control (ACC) system for detecting the vehicle which is driven in the same direction in the front driving lane and automatically accelerating/decelerating according to a speed of the front vehicle, a lane departure warning system (LDWS) for preventing a vehicle from deviating from the driving lane, a lane keeping assist system (LKAS) for controlling the vehicle and returning it to an original lane when it is determined that the vehicle is deviated from the driving lane, a blind spot detection (BSD) system for providing information on a vehicle located in a blind spot of the driver, and a rear-end collision warning (RCW) system for detecting a vehicle which is driven in the same direction in the rear driving lane and avoiding a collision with a rear vehicle.

The driver assistance system 170 may include a radar module 171 for detecting positions of the front and rear vehicles, and a camera module 172 for obtaining images of the front and rear vehicles. Specifically, the radar module 171 may be applied to apparatuses, such as the FCW system, the AEBS, the ACC system, the BSD system, and the RCW system, to detect the positions of the front and rear vehicles. Further, the camera module 172 may be applied to apparatuses, such as the LDWS, and the LKAS, to capture images of the front and rear vehicles and the road.

The gaze detection device 180 may detect a gaze of the driver using a camera module 181 provided in the inside of the vehicle. For example, the gaze detection device 180 may detect a direction in which the driver is looking by detecting a direction in which a head of the driver is facing and positions of pupils of the driver.

The wireless communication device 200 may communicate with a peripheral vehicle, an external terminal, etc. A configuration and an operation of the wireless communication device 200 will be described in detail below.

Figure 4:
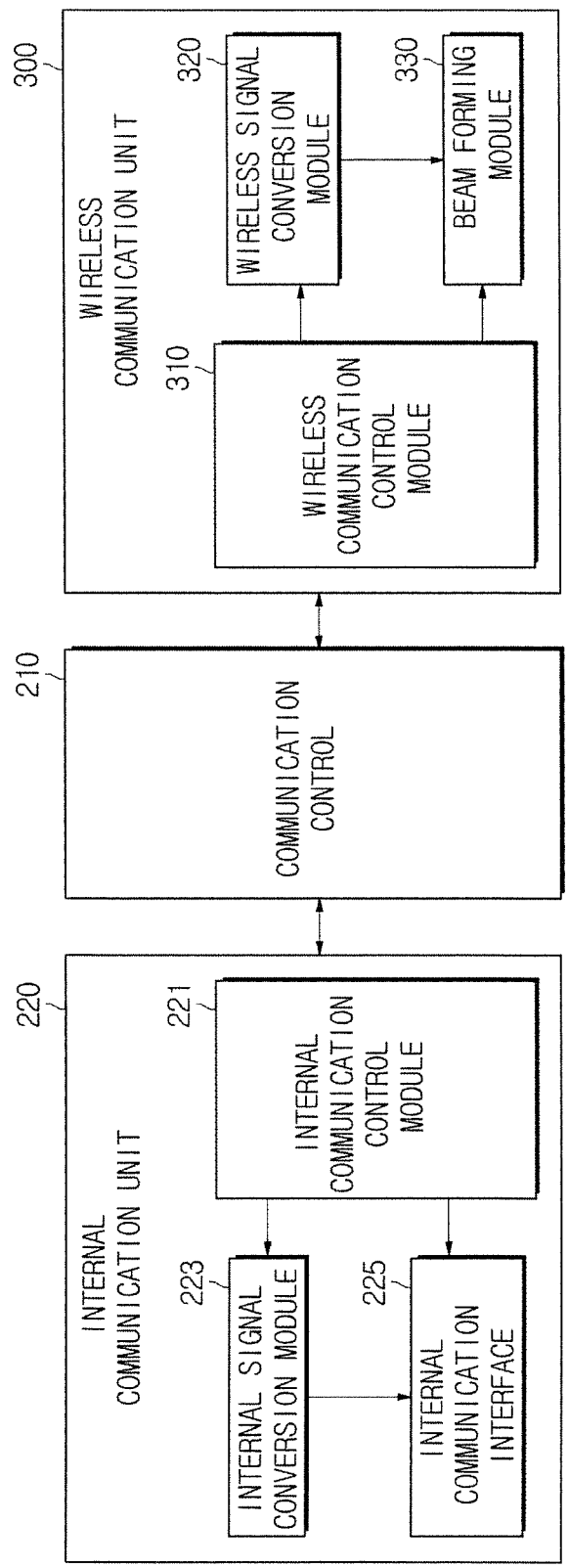
FIG. 4 is a diagram illustrating a wireless communication device included in a vehicle according to an embodiment of the present invention.
Figure 5:
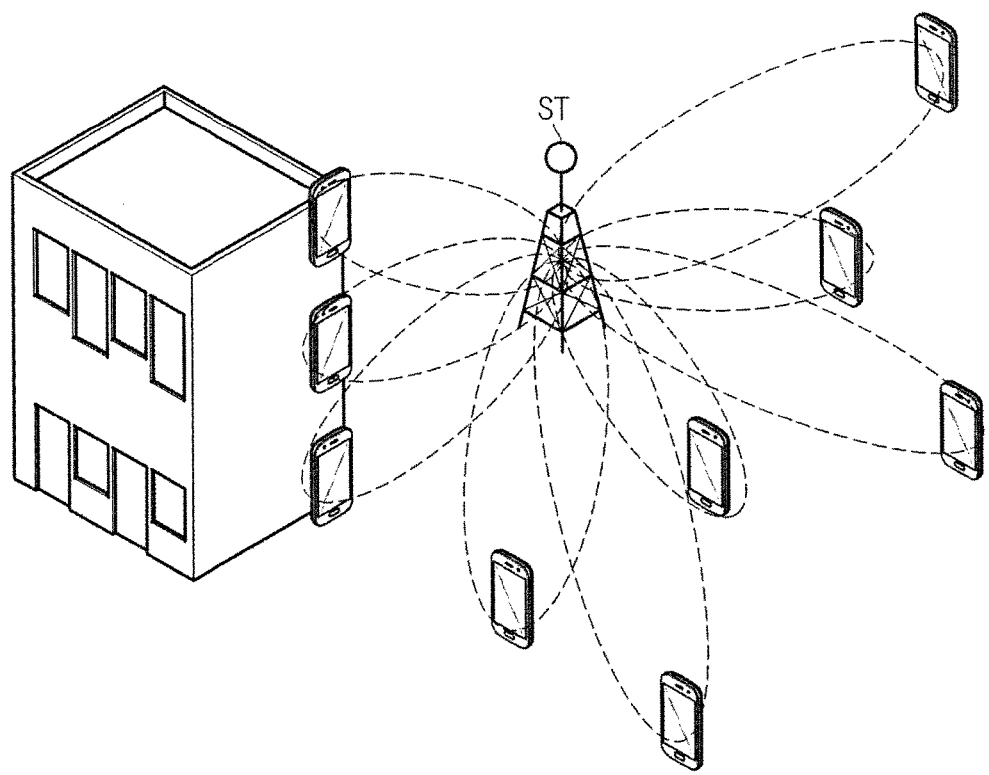
FIGS. 5 through 6C are diagrams for describing a fifth generation communication method.
Figure 6A:
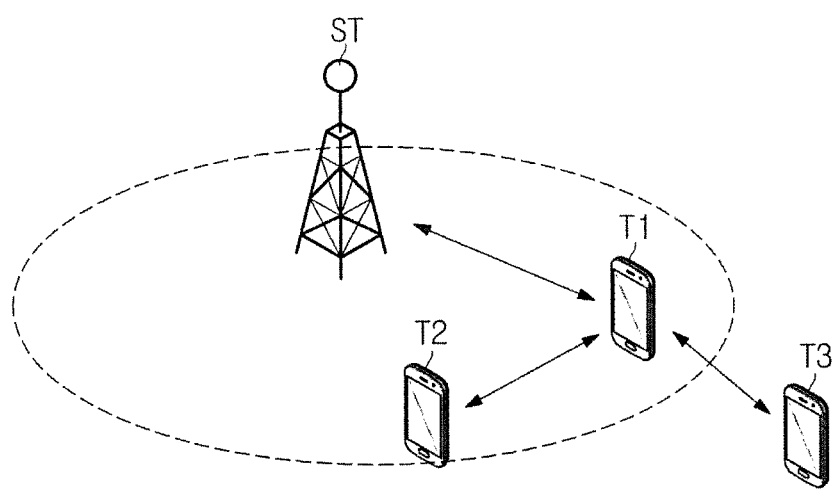
Figure 6B:
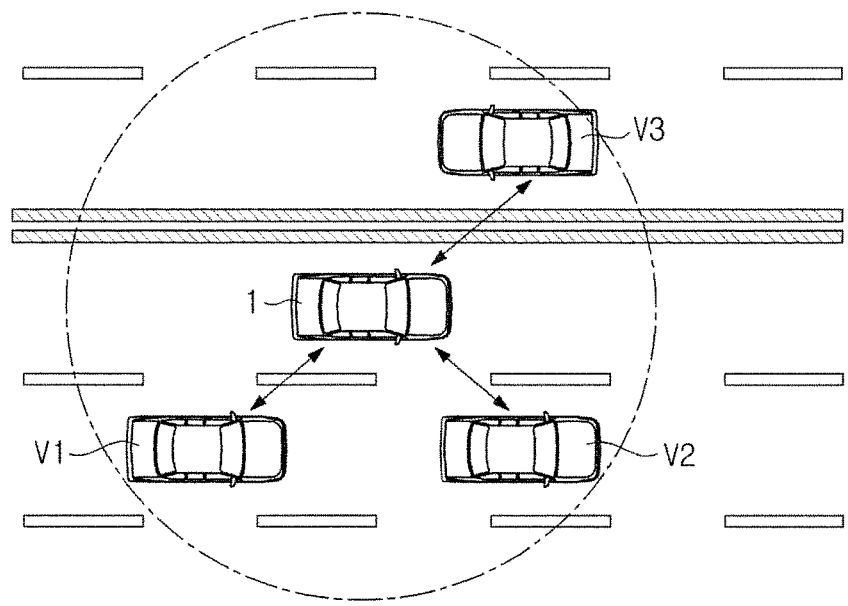
Figure 6C:
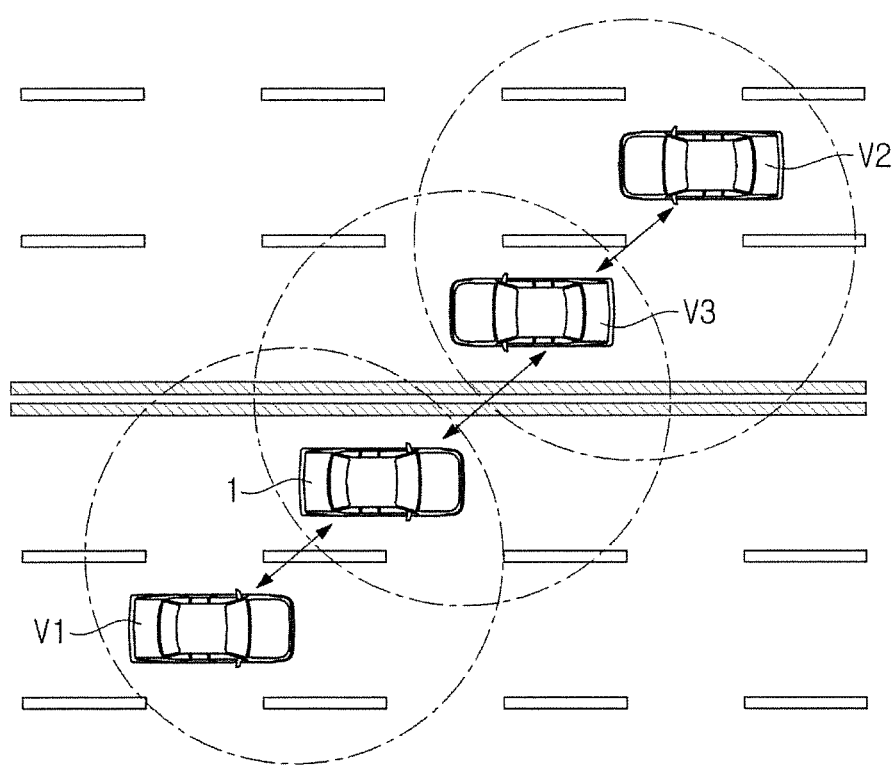
Figure 7:
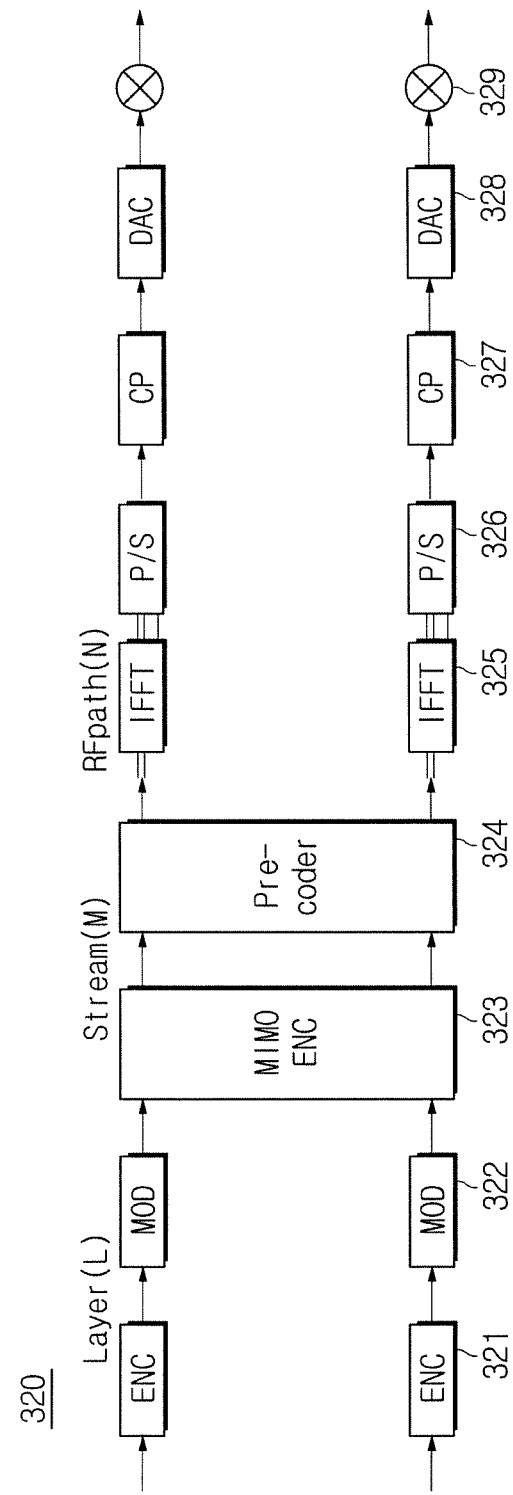
FIG. 7 is a diagram illustrating a wireless signal conversion module included in a vehicle according to an embodiment of the present invention.
Figure 8:
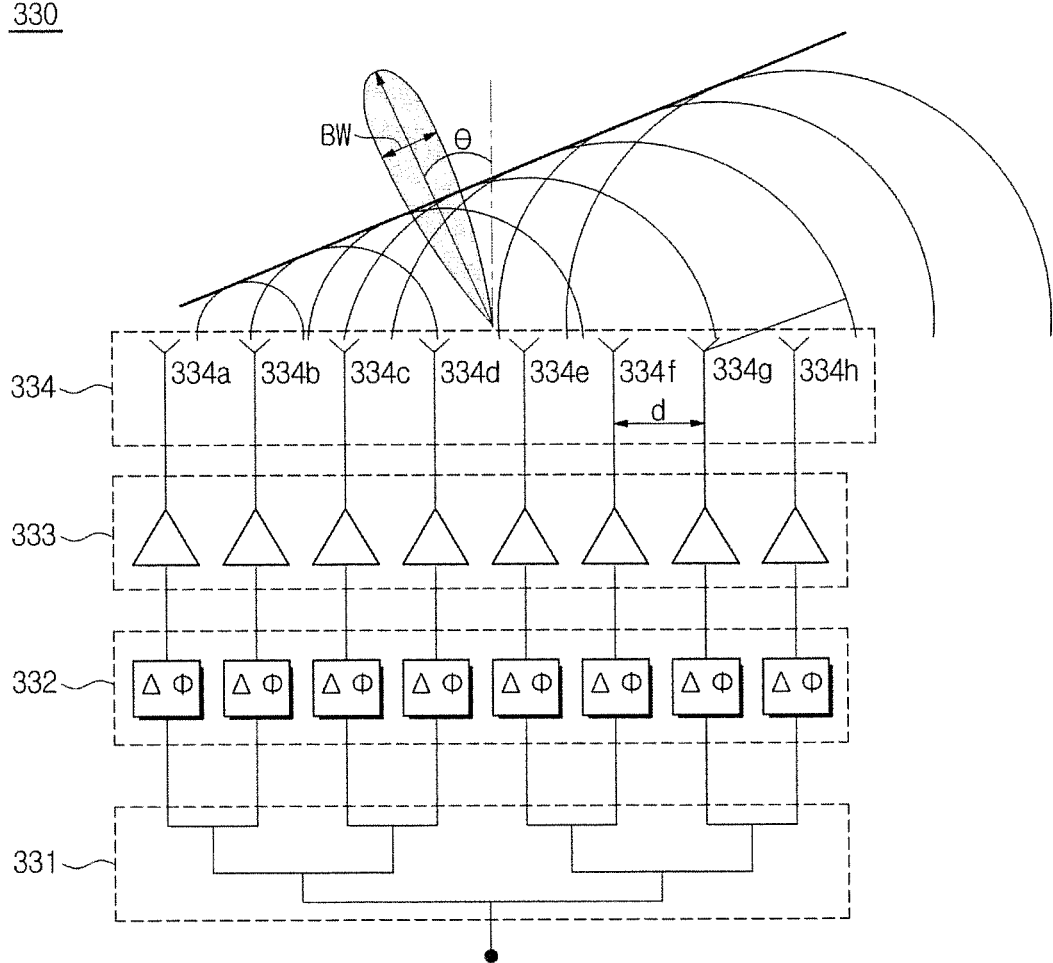
FIG. 8 is a diagram illustrating a beam forming module included in a vehicle according to an embodiment of the present invention.

FIG. 4 is a diagram illustrating a wireless communication device included in a vehicle according to an embodiment of the present invention, and FIGS. 5 through 6C are diagrams for describing a fifth generation communication method. Further, FIG. 7 is a diagram illustrating a wireless signal conversion module included in a vehicle according to an embodiment of the present invention, and FIG. 8 is a diagram illustrating a beam forming module included in a vehicle according to an embodiment of the present invention.

Referring to FIGS. 4 through 8, the wireless communication device 200 may include an internal communication unit 220 in communication with various kinds of internal electronic devices 100 included in the vehicle 1 through the NT of the inside of the vehicle 1, a wireless communication unit 300 in communication with a peripheral vehicle, a mobile terminal, or a wireless communication base station, and a communication controller 210 for controlling operations of the internal communication unit 220 and the wireless communication unit 300.

The internal communication unit 220 may include an internal communication interface 225 in communication with the NT, an internal signal conversion module 223 for modulating/demodulating a signal, and an internal communication control module 221 for controlling communication through the NT.

The internal communication interface 225 may receive communication signals transmitted from the various kinds of electronic devices 100 included in the vehicle 1 through the NT, and transmit the communication signals to the various kinds of electronics devices 100 included in the vehicle 1 through the NT. Here, the communication signal means a signal transceived through the NT.

The internal communication interface 225 may include a communication port in communication with the NT and the wireless communication device 200, and a transceiver for transceiving a signal.

The internal signal conversion module 223 may demodulate the communication signal received through the internal communication interface 225 into a control signal according to control of the internal communication control module 221 which will be described below, and modulate a digital control signal output from the communication controller 210 into an analog communication signal for transmission through the internal communication interface 225.

As described above, the communication signal means a signal transceived through the NT, and the control signal means a signal transceived inside the wireless communication device 200. The communication signal transceived through the NT and the control signal transceived between the internal communication unit 220 and the communication controller 210 may have formats different from each other.

For example, in the case of CAN communication, the communication signal may be transmitted through a pair of communication lines, and communication data of "1" or "0" may be transmitted according to a potential difference between the pair of communication lines. In contrast, the control signal transceived between the internal communication unit 220 and the communication controller 210 may be transmitted through a single line, and the control data of "1" or "0" may be transmitted according to a potential of the single line.

As such, the internal signal conversion module 223 modulates the control signal output from the communication controller 210 into the communication signal according to the communication protocol of the NT, and demodulates the communication signal according to the communication protocol of the NT into the control signal which is recognizable by the communication controller 210.

The internal signal conversion module 223 may include a memory which stores a program and data for performing modulation/demodulation on the communication signal, and a processor for performing the modulation/demodulation on the communication signal according to the program and the data stored in the memory.

The internal communication control module 221 controls the operations of the internal signal conversion module 223 and the internal communication interface 225.

For example, when transmitting the communication signal, the internal communication control module 221 determines whether the NT is occupied by another electronic device 100 through the internal communication interface 225, and when the NT is unoccupied, the internal communication control module 221 controls the internal communication interface 225 and the internal signal conversion module 223 to transmit the communication signal. Further, when receiving the communication signal, the internal communication control module 221 controls the internal communication interface 225 and the internal signal conversion module 223 to demodulate the communication signal received through the internal communication interface 225.

The internal communication control module 221 may include a memory which stores a program and data for controlling the internal signal conversion module 223 and the internal communication interface 225, and a processor for generating the control signal according to the program and the data stored in the memory.

In another embodiment, the internal signal conversion module 223 and the internal communication control module 221 may be implemented as a memory and a processor which are separated, or as a single device integrated with the memory and the processor.

Further, in still another embodiment, the internal communication control module 221 may be omitted. For example, the internal communication control module 221 may be integrated into the communication controller 210 which will be described below, and in this case, the communication controller 210 may directly control a signal transmission/reception of the internal communication unit 220.

The wireless communication unit 300 may transceive a signal with the vehicle and a mobile terminal or wireless communication base station.

The wireless communication unit 300 may transceive the signal through a variety of communication protocols.

For example, the wireless communication unit 300 may use a second generation (2G) communication method such as a time division multiple access (TDMA) and a code division multiple access (CDMA), a third generation (3G) communication method such as a wide CDMA (WCDMA) and a CDMA 2000 (CDMA 2000), a wireless broadband (WiBro), and a World Interoperability for Microwave Access (WiMAX), and a fourth generation (4G) communication method such as a long term evolution (LTE) and a wireless broadband evolution. Further, the wireless communication unit 300 may use a fifth generation (5G) communication method.

The 4G communication method may use a frequency band which is equal to or less than 2 GHz, but it may be possible for the 5G communication method to use a frequency band of about 28 GHz. However, the frequency band used in the 5G communication method is not limited thereto.

A large scale antenna system may be applied to the 5G communication method. The large scale antenna system may cover an ultra-high frequency band using dozens or more of antennas, which means a system capable of transceiving large amounts of data over multiple access at the same time. Since the large scale antenna system transceives a radio wave farther in a specific direction by adjusting an arrangement of the antennas, the large amount of data can be transmitted and an available range of the 5G communication network can also be expanded.

Referring to FIG. 5, a base station (ST) may simultaneously transceive data with many devices through the large scale antenna system. Further, the large scale antenna system may reduce noise by minimizing the radio waves emitted in directions other than a transmitting direction of the radio wave, and thus can improve communication quality and reduce an amount of power.

Further, the 5G communication method can perform multiple access of more devices by transmitting a wireless signal modulated using a non-orthogonal multiplexing access (NOMA) method than conventional technology which modulates a transmission signal using an orthogonal frequency division multiplexing (OFDM) method, and can perform the transmission and reception of large amounts of data at the same time.

For example, the 5G communication method may provide a maximum transmission speed of 1 Gbps. The 5G communication method may support immersive communication in which the transmission of large amounts of data, such as data of an ultra-high definition (UHD), three-dimensional (3D), hologram, etc., is required. Accordingly, a user may transceiver ultra-high capacity data which is more sophisticated and immersive more quickly using the 5G communication method.

Further, the 5G communication method may perform a real time processing within a maximum response speed which is equal to or less than 1 ms. Accordingly, the 5G communication method may support a real time service responding before user recognition. For example, the vehicle may receive sensor information from various kinds of devices while driving, and provide an autonomous driving system through the real time processing, and also provide various kinds of remote controls. Further, the vehicle may provide a collision probability to the user by processing the sensor information on other vehicles which are present in the periphery of the vehicle in real time using the 5G communication method, and also provide traffic condition information generated on the driving route to the user in real time.

Moreover, the vehicle may provide a big data service to the passengers in the vehicle through an ultra-real-time process and the large capacity transmission provided by the 5G communication method. For example, the vehicle may analyze various kinds of Web information, social network service (SNS) information, etc., and provide customized information suitable to situations of the passengers in the vehicle. In an embodiment, the vehicle may collect information on various kinds of famous restaurants and tourist sites which are present in the periphery of the driving route through a big data mining, provide the information in real time, and allow the passengers to directly confirm the information of the periphery of a region in which the vehicle is driven.

Meanwhile, the 5G communication network may support a high density and large capacity transmission by further subdividing a cell thereof. Here, the cell means a region subdivided a wide region into a small region in order to effectively use a frequency in the mobile communication. At this time, communication between terminals may be supported by installing a small cell base station in each cell. For example, the 5G communication network may be further subdivided by decreasing the size of the cell, and may be formed as a two-step structure of a macro cell base station-a distributed small cell base station-a communication terminal.

Further, a relay transmission of the wireless signal may be performed using a multihop method in the 5G communication network. For example, as shown in FIG. 6A, a first terminal T1 may relay-transmit the wireless signal to be transmitted by a third terminal T3 located outside the network of the base station ST to the base station ST. Further, the first terminal T1 may relay-transmit the wireless signal to be transmitted by a second terminal T2 located inside the network of the base station ST to the base station ST. As described above, at least one device of the devices capable of using the 5G communication network may perform the relay transmission using the multihop method, but is not limited thereto. Accordingly, a region supported by the 5G communication network may be expanded, and also a buffering problem generated when there are many users in the cell may be solved.

Meanwhile, the 5G communication method can perform device-to-device (D2D) communication applied to a vehicle, a wearable device, etc. The D2D communication may be communication performed between devices, which mean communication for transceiving wireless signals in which not only data sensed by a device through a sensor but also various kinds of data stored in the device are included. In the D2D communication method, since it is not necessary to transceive the wireless signal through the base station and the wireless signal transmission is performed between the devices, unnecessary energy can be reduced. At this time, in order to use the 5G communication method, an antenna may be included in a corresponding device such as the vehicle, the wearable device, etc.

The vehicle 1 may transceive a wireless signal with other vehicles present in the periphery of the vehicle through the D2D communication. For example, as shown in FIG. 6B, the vehicle 1 may perform the D2D communication with other vehicles V1, V2, and V3 present in the periphery of the vehicle. In addition, the vehicle 1 may perform the D2D communication with a transportation information apparatus (not shown) installed in a crossroad, etc.

In another example, as shown in FIG. 6C, the vehicle 1 may transceive the wireless signal with the vehicles V1 and V3 through the D2D communication, and the vehicle V3 may transceive data with the vehicles 1 and V2 through the D2D communication. That is, a virtual network may be formed between a plurality of vehicles 1, V1, V2, and V3 located within a distance in which the D2D communication is possible, and the wireless signal may be transceived.

Meanwhile, the 5G communication network may support the D2D communication with a device located in a farther position by expanding a region in which the D2D communication is supported. Further, since the 5G communication network supports the real time process in which a response speed is equal to or less than 1 ms and the high capacity communication which is equal to or more than 1 Gbps, a signal including desired data may be transceived even between vehicles which are underway.

For example, the vehicle may transceive data in communication with another vehicle, various kinds of servers, a system, etc. present in the periphery of the vehicle in real time through the 5G communication method even while underway, and provide various kinds of services such as a navigation service through an augmented reality by processing the data.

In addition, the vehicle may use a band other than the frequency band described above and transceive a wireless signal including data through the D2D communication. The present disclosure is not limited only to a communication method using the frequency band described above.

Hereinafter, it is assumed that the wireless communication unit 300 uses the 5G communication method.

As shown in FIG. 4, the wireless communication unit 300 may include a wireless signal conversion module 320 for modulating/demodulating a signal, a beam forming module 330 which forms a beam pattern for wireless communication and transceives a wireless signal through a radio wave of the beam pattern, and a wireless communication control module 310 for controlling the wireless communication.

The wireless signal conversion module 320 demodulates a wireless communication signal received through the beam forming module 330 into a control signal according to a control of the wireless communication control module 310 which will be described below, and modulates the control signal output from the communication controller 210 into the wireless communication signal for transmission through the beam forming module 330.

The wireless communication signal transceived through the wireless communication has a format different from the control signal in order to secure the reliability of the wireless communication. Particularly, there may be a difference in which the wireless communication signal is an analog signal but the control signal is a digital signal.

Further, the wireless communication signal may be transmitted by loading a signal into a carrier wave of a high frequency (for example, about 28 GHz in the 5G communication method) in order to transmit the signal. For this, the wireless signal conversion module 320 may generate a communication signal by modulating the carrier wave according to the control signal output from the communication controller 210, and demodulate the control signal by demodulating the communication signal received through the array antenna 340.

For example, as shown in FIG. 7, the wireless signal conversion module 320 may include an encoder (ENC) 321, a modulator (MOD) 322, a multiple input multiple output (MIMO) encoder 323, a pre-coder 324, an inverse fast Fourier transformer (IFFT) 325, a parallel-to-serial (P/S) converter 326, a cyclic prefix (CP) inserter 327, a digital-to-analog converter (DAC) 328, and a frequency converter 329.

Further, L control signals are input to the MIMO encoder 323 through the ENC 321 and the MOD 322. M streams output from the MIMO encoder 323 are pre-coded by the pre-coder 324, and converted into N pre-coded signals. The pre-coded signals are output as analog signals through the IFFT 325, the P/S converter 326, the CP inserter 327, and the DAC 328. The analog signal output from the DAC 328 may be converted into a signal of a radio frequency (RF) band through the frequency converter 329.

The wireless signal conversion module 320 may include a memory which stores a program and data for performing modulation/demodulation of the communication signal, and a processor for performing the modulation/demodulation of the communication signal according to the program and the data stored in the memory.

The wireless signal conversion module 320 is not limited to the embodiment described with FIG. 7, and may have various embodiments according to the communication methods.

The analog signal converted into the RF band may be input to the beam forming module 330.

The beam forming module 330 may transceive the wireless signal by forming the beam pattern for the wireless communication according to the control of the wireless communication control module 310 which will be described below.

The 5G communication method may transmit the wireless signal in a radial form, or transmit the wireless signal to a specific region or a specific device through the beam forming. At this time, the 5G communication method may transmit the wireless signal through the beam forming using a millimeter-wave band. Here, the millimeter-wave band means a band which is equal to or more than 30 GHz and is equal to or less than 300 GHz, but is not limited thereto.

The beam forming module 330 may form the beam pattern using a phased array antenna.

Here, the beam pattern is a pattern represented by an intensity of the wireless signal when focusing the wireless signal in a specific direction. In other words, the beam pattern means a pattern in which power of the wireless signal is concentrated. Accordingly, the vehicle 1 may transmit the wireless signal having a sufficient intensity to a communication target (a peripheral vehicle, an external terminal, or a base station) located inside the beam pattern, and receive the wireless signal having the sufficient intensity from the communication target located inside the beam pattern.

Further, as the communication target is deviated from the center of the beam pattern, the intensity of the wireless signal transmitted from the vehicle 1 to the communication target is decreased, and the intensity of the wireless signal received from the communication target to the vehicle 1 is also decreased.

Moreover, the phased array antenna is an antenna in which unit antenna devices are regularly arranged, and the antenna may control the beam pattern of the entire phased array antenna by controlling a phase difference of the wireless signals output from the unit antenna devices.

For example, as shown in FIG. 8, the beam forming module 330 may include a power divider 331 for dividing a power of an analog signal output from the wireless signal conversion module 320, a phase converter 332 for converting a phase of the analog signal, a variable gain amplifier 333 for amplifying the power of the analog signal, and an array antenna 334 for transceiving the analog signal.

The beam forming module 330 may distribute the power of the analog signal to each of unit antennas 334a to 334h through the power divider 331, and form various beam patterns BP by controlling the power transmitted to each of the unit antennas 334a to 334h through the phase converter 332 and the variable gain amplifier 333.

At this time, when a main direction of the beam pattern BP of the radio wave to be output from the array antenna 334 is θ, a phase difference Δφ through the phase converter 332 may be expressed by the following Equation 1.

$$\Delta \varphi = -\frac{2\pi d}{\lambda}\cos\theta \quad \text{[Equation 1]}$$

(Δφ represents a phase difference, d represents an interval between the unit antennas, and λ represents a main direction of a beam pattern.)

According to the Equation 1, the main direction θ of the beam pattern is determined by the phase difference Δφ between the unit antennas 334a to 334h and the interval d between the unit antennas 334a to 334h.

Further, a 3 dB beam width of one beam pattern BP to be output from the array antenna 334 may be expressed by the following Equation 2.

$$BW \simeq \sin^{-1}\left(\frac{2 \times 1.391 \lambda}{\pi d N}\right). \quad \text{[Equation 2]}$$

(BW represents a beam width of a beam pattern, d represents an interval between unit antennas, λ represents a wavelength of a carrier wave, and N represents the number of array antennas.)

According to Equation 2, the beam width BW of the beam pattern BP is determined by the interval d between the unit antennas 334a to 334h, and the number N of the unit antennas 334a to 334h.

The wireless communication control module 310 controls operations of the wireless signal conversion module 320 and the beam forming module 330.

For example, when establishing communication with a peripheral vehicle, an external terminal or an external base station, the wireless communication control module 310 may control the wireless signal conversion module 320 and the beam forming module 330 in order to evaluate an optimal wireless communication channel. The wireless communication control module 310 may evaluate the wireless communication channel according to the beam pattern BP, and generate the optimal wireless communication channel based on the evaluation result.

Further, when transmitting the communication signal, the wireless communication control module 310 may control the beam forming module 330 to form the beam pattern BP for transmitting the communication signal. The wireless communication control module 310 may control the phase difference Δφ between the unit antennas 334a to 334h to control the main direction θ of the beam pattern BP formed by the beam forming module 330. Further, when receiving the communication signal, the wireless communication control module 310 may control the beam forming module 330 to form the beam pattern BP for receiving the communication signal.

The above-described wireless communication control module 310 may include a memory which stores a program for controlling the wireless signal conversion module 320 and the beam forming module 330 and data, and a processor for generating a control signal according to the program and the data stored in the memory.

In an embodiment, the wireless signal conversion module 320 and the wireless communication control module 310 may be implemented as a memory and a processor which are separated, or as a single device integrated with the memory and the processor.

Further, in another embodiment, the wireless communication control module 310 may be omitted. For example, the wireless communication control module 310 may be integrated into the communication controller 210 which will be described below, and in this case, the communication controller 210 may directly control signal transmission/reception of the wireless communication unit 300.

The communication controller 210 controls operations of the internal communication unit 220 and the wireless communication unit 300.

When a signal is received through the internal communication unit 220, the communication controller 210 analyzes the received signal, and controls the operations of the internal communication unit 220 and the wireless communication unit 300 according to the analyzed result.

For example, when a data transmission request is received from another electronic device 100 included in the vehicle 1 through the internal communication unit 220, the communication controller 210 may control the wireless communication unit 300 to transmit corresponding data to the peripheral vehicle, the external terminal, or the external base station.

Further, when the data is received from the peripheral vehicle, the external terminal, or the external base station, the communication controller 210 may analyze the received data, determine a target device of the received data, and control the internal communication unit 220 to transmit the received data to the target device.

The communication controller 210 may include a memory which stores a program for controlling the internal communication unit 220 and the wireless communication unit 300 and data, and a processor for generating a control signal according to the program and the data stored in the memory.

The configurations of the various kinds of electronic devices 100 included in the vehicle 1 together with the wireless communication device 200 are described above.

Hereinafter, operations of the various kinds of electronic devices 100 included in the vehicle 1 will be described. Particularly, an operation of the wireless communication device 200 will be described.

Figure 9:
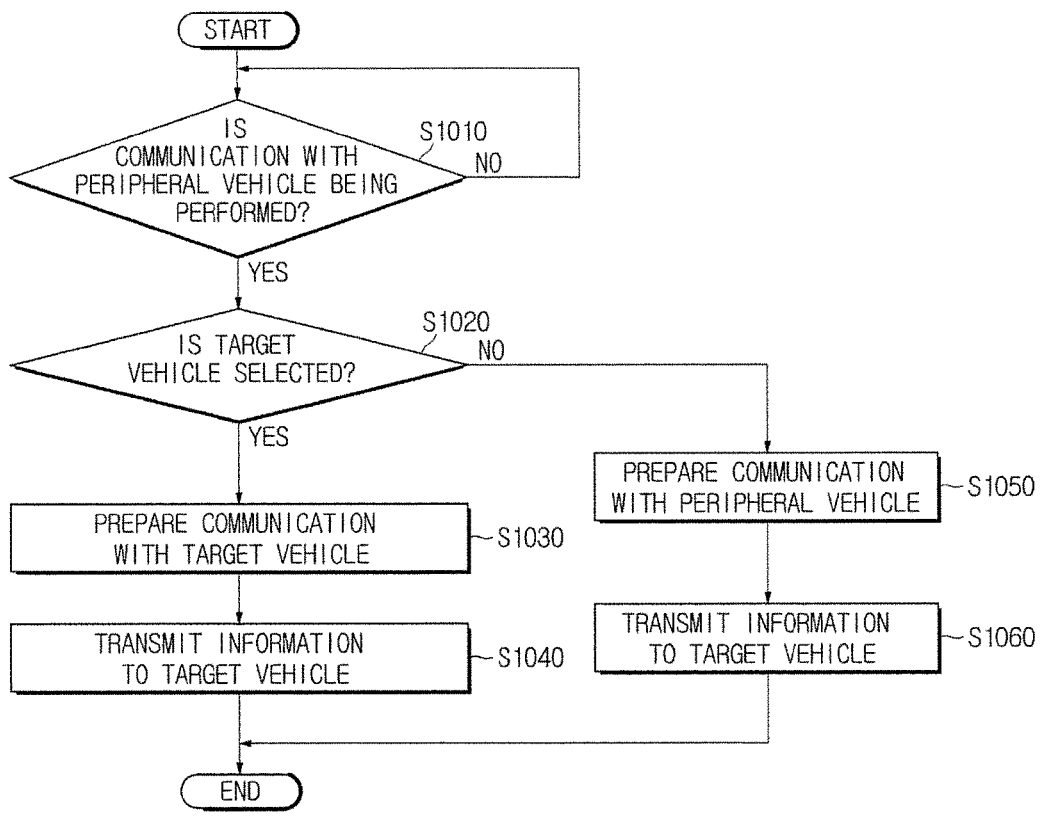
FIG. 9 is a diagram illustrating one example of a communication method of a vehicle according to an embodiment of the present invention.
Figure 10:
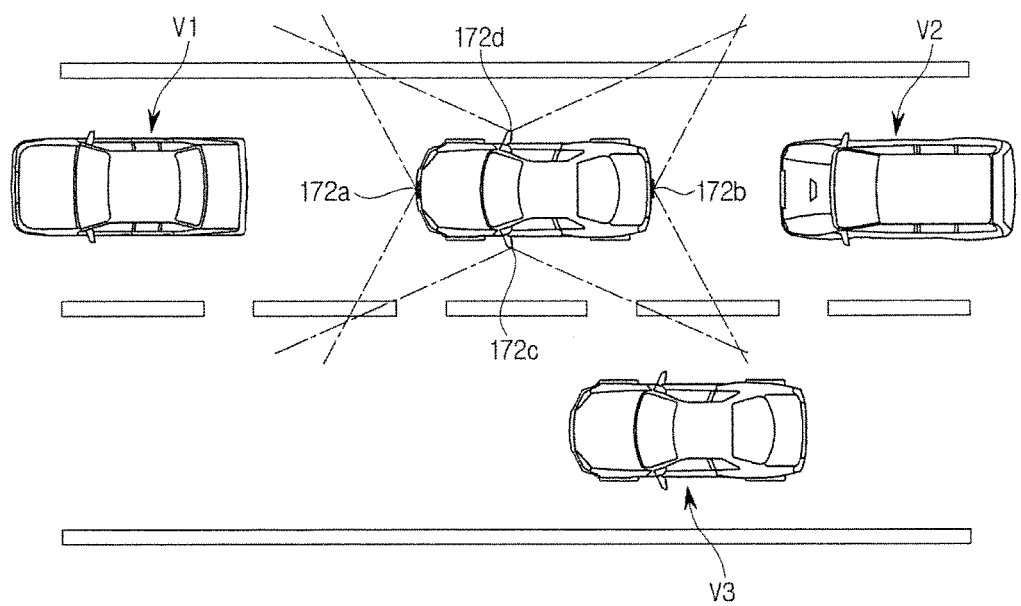
FIG. 10 is a diagram illustrating an example in which a vehicle obtains an image of a peripheral vehicle according to the communication method shown in FIG. 9.
Figure 11:
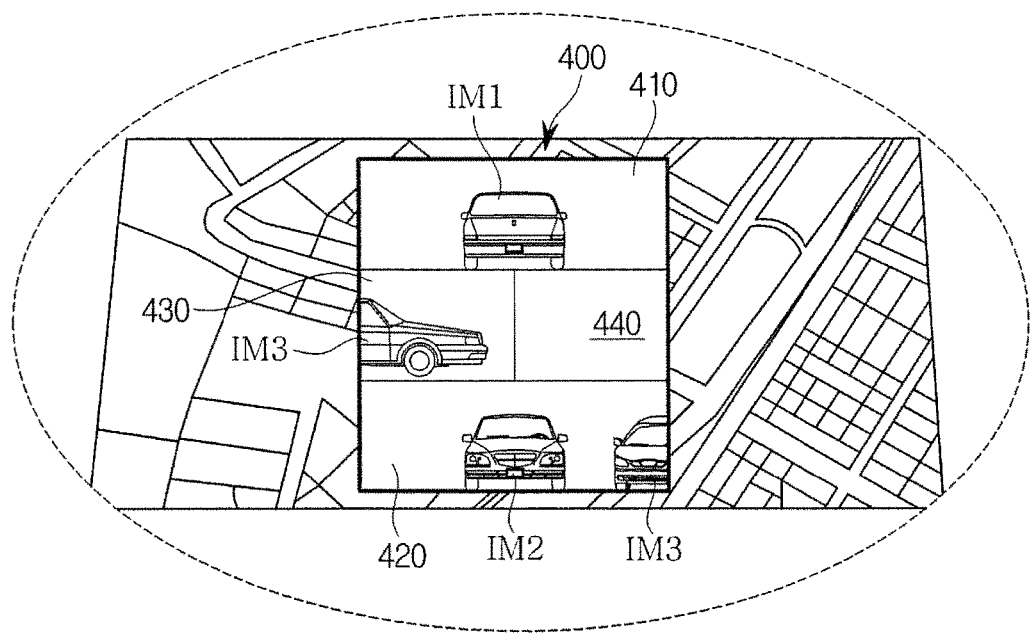
FIGS. 11 and 12 are diagrams illustrating an example in which a vehicle displays an image of a peripheral vehicle according to the communication method shown in FIG. 9.
Figure 12:
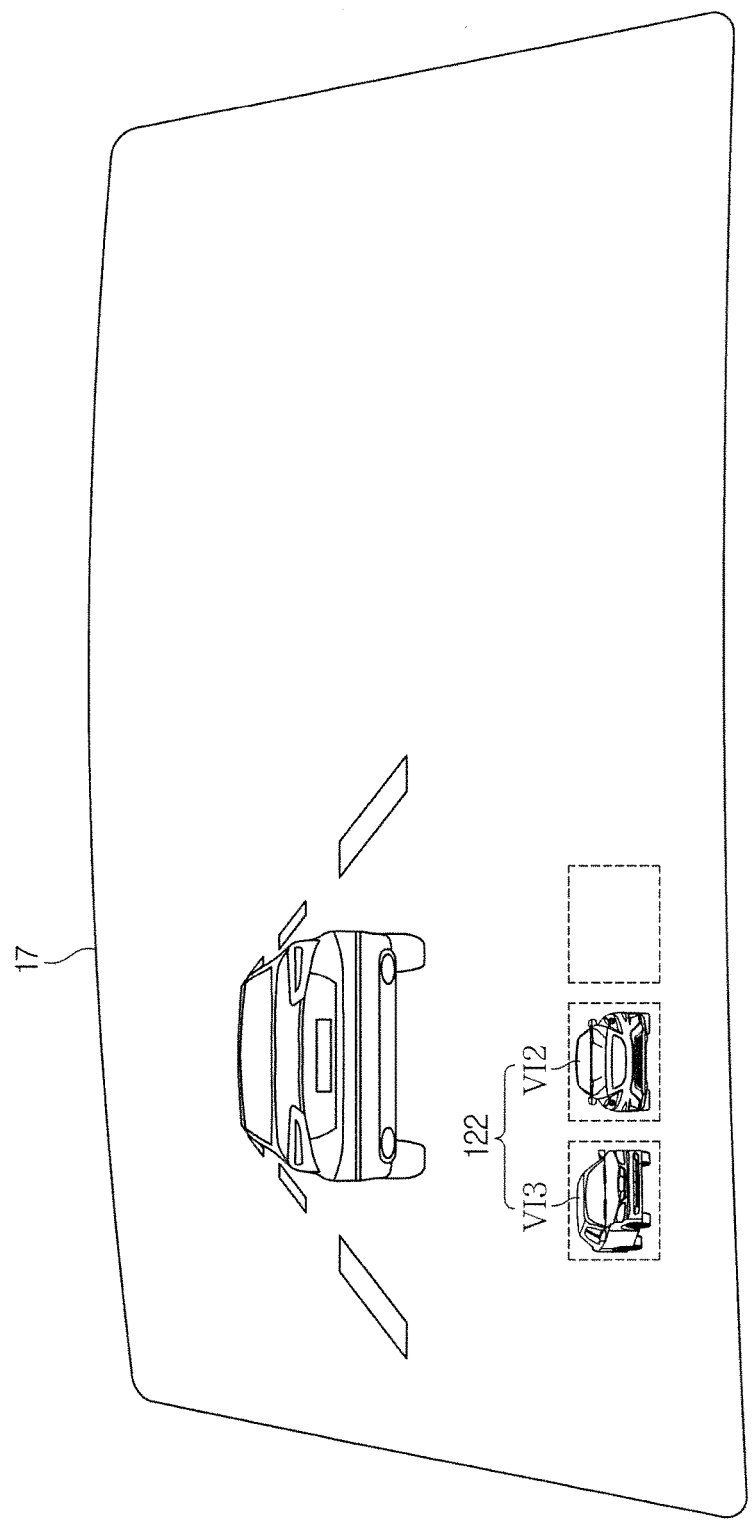
Figure 13:
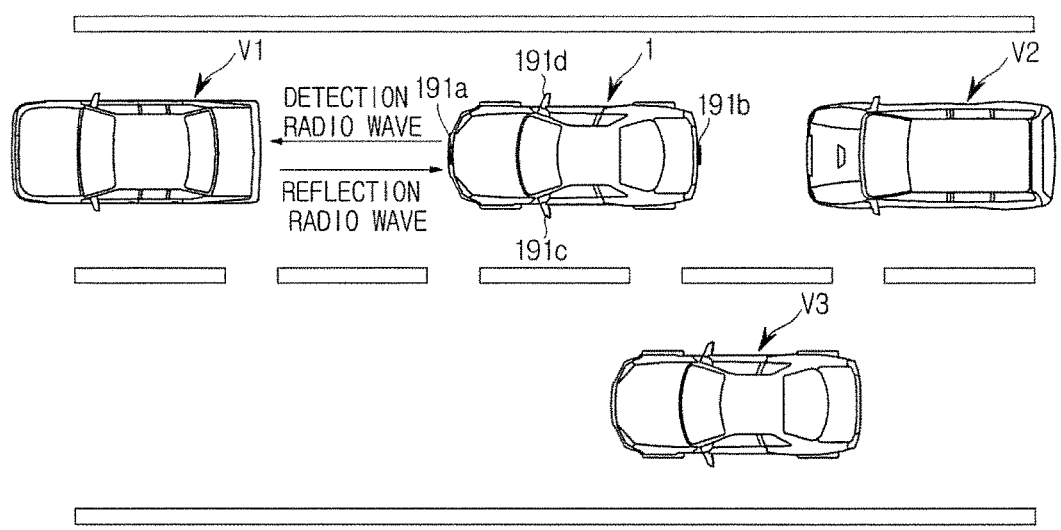
FIGS. 13 through 15 are diagrams illustrating an example in which a vehicle detects a position of a peripheral vehicle according to the communication method shown in FIG. 9.
Figure 14:
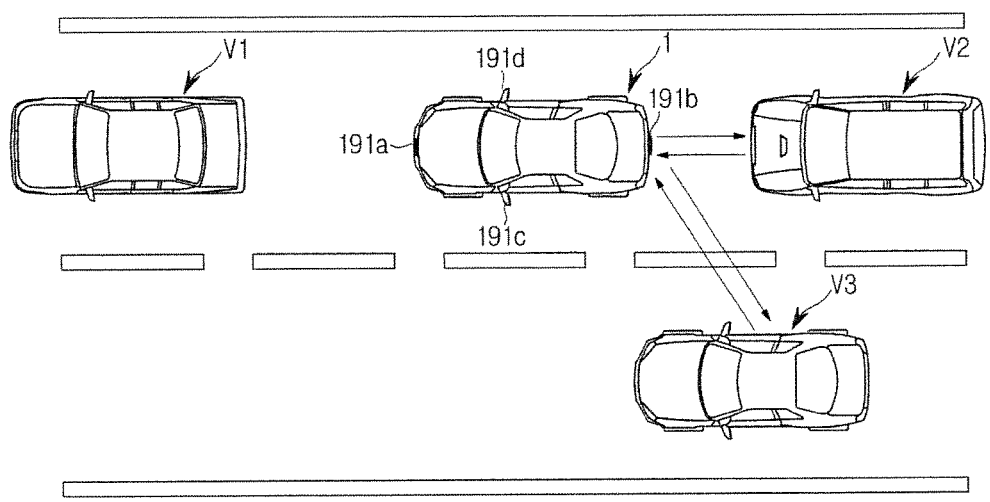
Figure 15:
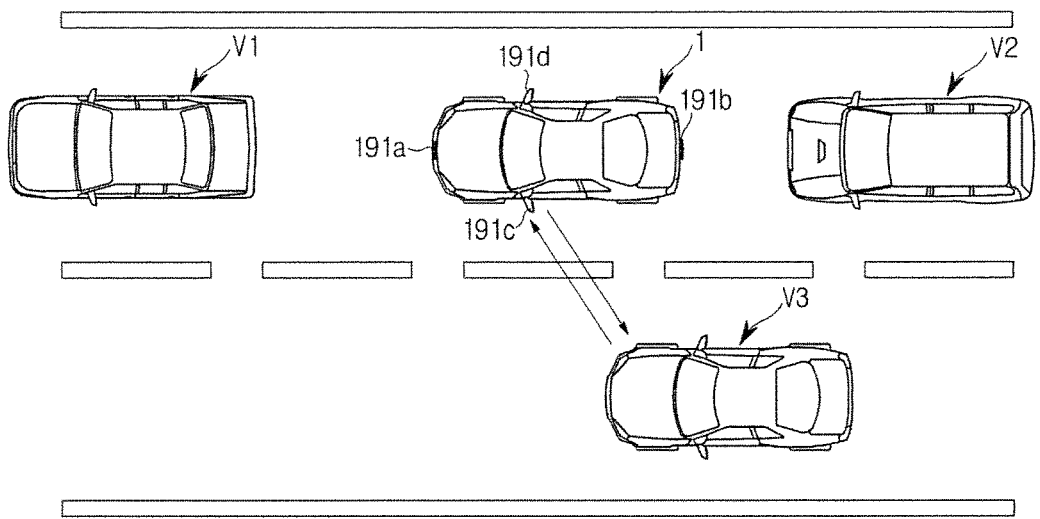
Figure 16:
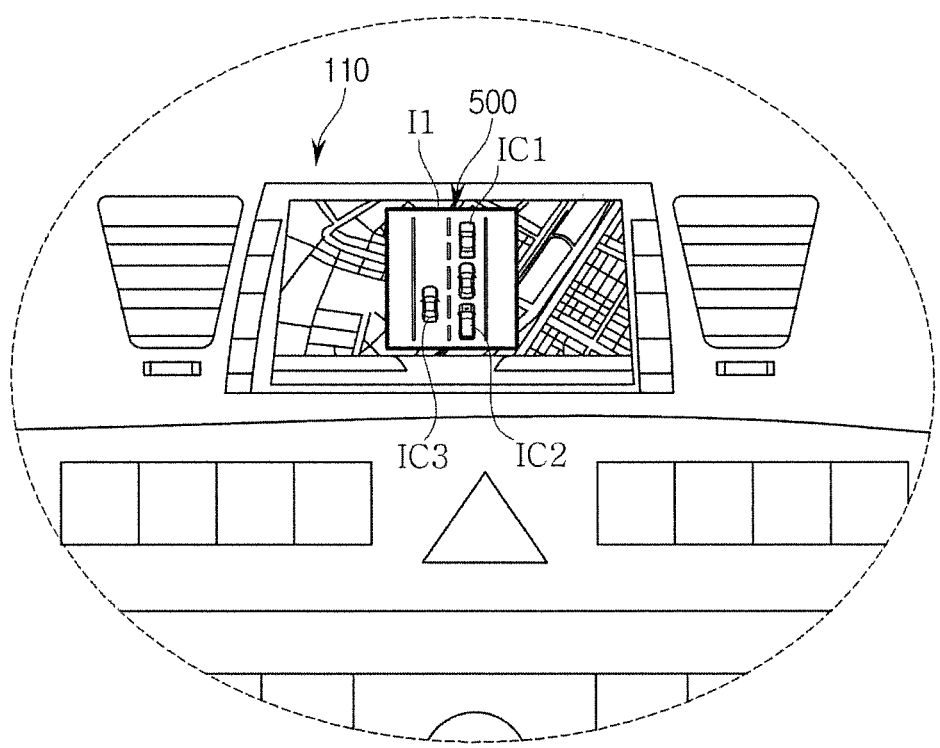
FIGS. 16 and 17 are diagrams illustrating an example in which a vehicle displays position information of a peripheral vehicle according to the communication method shown in FIG. 9.
Figure 17:
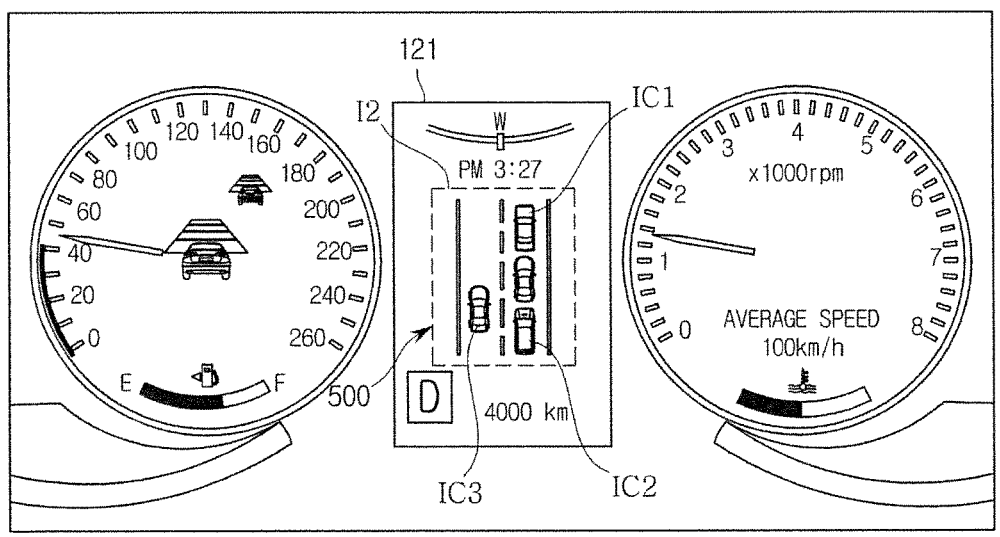

FIG. 9 is a diagram illustrating one example of a communication method of a vehicle according to an embodiment of the present invention. FIG. 10 is a diagram illustrating an example in which a vehicle obtains an image of a peripheral vehicle according to the communication method shown in FIG. 9, and FIGS. 11 and 12 are diagrams illustrating an example in which a vehicle displays an image of a peripheral vehicle according to the communication method shown in FIG. 9. Further, FIGS. 13 through 15 are diagrams illustrating an example in which a vehicle detects a position of a peripheral vehicle according to the communication method shown in FIG. 9, and FIGS. 16 and 17 are diagrams illustrating an example in which a vehicle displays position information of a peripheral vehicle according to the communication method shown in FIG. 9. Moreover, FIGS. 18 through 23 are diagrams illustrating an example of forming a beam pattern according to the communication method shown in FIG. 9.

Hereinafter, a communication method 1000 in which the vehicle 1 communicates with the peripheral vehicles V1, V2, and V3 will be described with reference to FIGS. 9 through 23.

The vehicle 1 determines whether to communicate with the peripheral vehicles V1, V2, and V3 (S1010).

The vehicle 1 may communicate with the peripheral vehicles V1, V2, and V3 for various reasons. For example, when a driver orders communication with the peripheral vehicles V1, V2, and V3 or transmits operation information on the vehicle 1 to the peripheral vehicles V1, V2, and V3, the vehicle 1 may communicate with the peripheral vehicles V1, V2, and V3.

When the driver tries to chat with drivers of the peripheral vehicles V1, V2, and V3 through a chatting application installed in the AVN device 110, the AVN device 110 may request to the wireless communication device 200 for communication with the peripheral vehicles V1, V2, and V3 through the NT. At this time, the wireless communication device 200 may try the communication with the peripheral vehicles V1, V2, and V3 by the communication request of the AVN device 110.

Further, when a malfunction occurs in the brake apparatus of the vehicle 1, the brake control apparatus 150 may request to the wireless communication device 200 for communication with the peripheral vehicles V1, V2, and V3 through the NT. At this time, the wireless communication device 200 may try the communication with the peripheral vehicles V1, V2, and V3 by the communication request of the brake control apparatus 150.

When it is determined that the vehicle 1 is not communicating with the peripheral vehicles V1, V2, and V3 ("No" in operation S1010), the vehicle 1 continuously performs an operation which is being performed.

Further, when it is determined that the vehicle 1 is communicating with the peripheral vehicles V1, V2, and V3 ("Yes" in operation S1010), the vehicle 1 determines whether the target vehicle is selected (S1020). Here, the target vehicle means a vehicle to be communicated with the vehicle 1. One or two or more vehicles may be selected as the target vehicle.

The target vehicle may be selected through a variety of methods.

First, the vehicle 1 may display an image of the peripheral vehicles on display units 111, 121, and 122 of the AVN device 110 or the input and output control system 120, and obtain position information of the vehicle selected by the driver.

Second, the vehicle 1 may obtain the position information of the peripheral vehicles using the driver assistance system 170, and may receive the target vehicle selected by the driver based on the obtained position information.

The first method for detecting peripheral vehicles will be described.

The vehicle 1 may obtain images of the peripheral vehicles using the camera module 172 included in the driver assistance system 170. Specifically, the wireless communication device 200 which receives a communication request from the peripheral vehicles V1, V2, and V3 may request to the driver assistance system 170 for an image acquisition of the peripheral vehicles V1, V2, and V3 in order to obtain the images of the peripheral vehicles V1, V2, and V3.

The driver assistance system 170 which receives the image acquisition request of the peripheral vehicles V1, V2, and V3 may obtain the images of the peripheral vehicles V1, V2, and V3 using the camera module 172 (i.e., 172a, 172b, 172c, and 172d). Here, the camera module 172 may include a first camera 172a located in the front of the vehicle 1, a second camera 172b located in the rear of the vehicle 1, a third camera 172c located in the left side of the vehicle 1, and a fourth camera 172d located in the right side of the vehicle 1.

The driver assistance system 170 may control the first to fourth cameras 172a to 172d to sequentially or simultaneously obtain the images of the peripheral vehicles V1, V2, and V3. For example, as shown in FIG. 10, the first camera 172a may obtain the image of the first vehicle V1, the second camera 172b may obtain the image of the second and third vehicles V2 and V3, and the third camera 172c may obtain the image of the third vehicle V3.

The driver assistance system 170 which obtains the images of the peripheral vehicles V1, V2, and V3 transmits image information on the peripheral vehicles V1, V2, and V3 to the AVN device 110 or the input and output control system 120 through the NT.

The AVN device 110 or the input and output control system 120 which receives the image information of the peripheral vehicles V1, V2, and V3 displays the images of the peripheral vehicles V1, V2, and V3 on the AVN display unit 111, the cluster display unit 121, or the head-up display unit 122.

For example, as shown in FIG. 11, the AVN device 110 may display a peripheral vehicle image 400 including the images of the peripheral vehicles V1, V2, and V3 on the AVN display unit 111. The peripheral vehicle image 400 may include a front image region 410, a rear image region 420, a left image region 430, and a right image region 440.

Further, a first vehicle image IM1 for representing the first vehicle V1 may be displayed in the front image region 410, and a second vehicle image IM2 for representing the second vehicle V2 and a third vehicle image IM3 for representing the third vehicle V3 may be displayed in the rear image region 420. Further, a third vehicle image IM3 for representing the third vehicle V3 may be displayed in the left image region 430.

The driver may select the target vehicle by touching the vehicle image which indicates the target vehicle among the vehicle images IM1, IM2, and IM3 displayed on the AVN display unit 111.

When the driver touches the vehicle image which indicates the target vehicle among the vehicle images IM1, IM2, and IM3 displayed on the AVN display unit 111, the AVN device 110 may detect touch coordinates of the driver, and obtain the position information of the target vehicle based on the detected touch coordinates.

When the driver touches the third vehicle image IM3 in the left image region 430, the AVN device 110 may determine that the target vehicle is located on the left of the vehicle 1. Further, the AVN device 110 may determine a direction in which the target vehicle is located by mapping the touch coordinates of the driver to a capturing direction of the third camera 172c. In other words, the AVN device 110 may determine coordinates in the left image region 430 corresponding to the touch coordinates of the driver, and determine a direction in which the target vehicle is located by mapping the coordinates in the left image region 430 to the capturing direction of the third camera 172c.

Moreover, the AVN device 110 which determines the position of the target vehicle may transmit the position information on the target vehicle to the wireless communication device 200.

In another example, as shown in FIG. 12, the input and output control system 120 may display the peripheral vehicle image 400 including the images of the peripheral vehicles V2 and V3 on the front window 17 through the head-up display unit 122. The peripheral vehicle image 400 displayed on the front window 17 through the head-up display unit 12 may include a rear image region 420, a left image region 430, and a right image region 440. Since the vehicle located in front of the vehicle 1 is displayed on the front window, the front image may not be displayed.

Further, a second vehicle image IM2 which indicates the second vehicle V2 and a third vehicle image IM3 which indicates the third vehicle V3 may be displayed in the rear image region 420. Moreover, the third vehicle image IM3 which indicates the third vehicle V3 may be displayed in the left image region 430.

The driver may select the target vehicle by staring at the vehicle image which indicates the target vehicle among the vehicle images IM1, IM2, and IM3 displayed on the front window 17. Specifically, the driver may select the target vehicle by staring at any one among the images of the front vehicle which is visible through the front window 17, the left/right vehicle, and the rear vehicle projected on the front window 17 through the head-up display unit 122.

When the driver stares in a specific direction, the gaze detection device 180 may detect the gaze of the driver. As described above, the gaze detection device 180 may detect a direction in which the head of the driver is facing and the positions of the pupils of the driver, and determine the gaze of the driver based on the direction of the head and the positions of the pupils of the driver.

The gaze detection device 180 may detect the gaze of the driver, and transmit gaze information to the input and output control system 120 through the NT, and the input and output control system 120 may obtain the gaze information on the driver and the position information of the target vehicle.

When the driver stares at the third vehicle image IM3 in the left image region 430, the input and output control system 120 may determine that the target vehicle is located on the left of the vehicle 1. Further, the input and output control system 120 may determine a direction in which the target vehicle is located by mapping a gaze coordinate of the driver to the capturing direction of the third camera 172c.

As described above, the vehicle 1 may obtain the image of the peripheral vehicle using the camera module 172, and display the obtained image for the driver. Further, when the driver selects the image of the target vehicle among the displayed images, the vehicle 1 may obtain the position information on the target vehicle based on the image of the selected target vehicle.

Further, the input and output control system 120 which determines the position of the target vehicle may transmit the position information on the target vehicle to the wireless communication device 200.

Next, the second method for detecting peripheral vehicles will be described.

As described above, the vehicle 1 may obtain the position information on the peripheral vehicle, and display the obtained position information to the driver. The driver may select the target vehicle based on the position information from vehicle 1.

The vehicle 1 may obtain the position information on the peripheral vehicle using the radar module 171 included in the driver assistance system 170. Specifically, the wireless communication device 200 which receives the communication request from the peripheral vehicles V1, V2, and V3 may request to the driver assistance system 170 for position detection of the peripheral vehicles V1, V2, and V3 in order to obtain the position information on the peripheral vehicles V1, V2, and V3.

The driver assistance system 170 which receives the position detection request of the peripheral vehicles V1, V2, and V3 may detect the positions of the peripheral vehicles V1, V2, and V3 using the radar modules 171 (Le., 171a, 171b, 171c, and 171d) or an ultrasonic sensor module (not shown). Here, the radar module 171 may include a first radar sensor 171a located in the front of the vehicle 1, a second radar sensor 171b located in the rear of the vehicle 1, a third radar sensor 171c located in the left side of the vehicle 1, and a fourth radar sensor 171d located in the right side of the vehicle 1.

When detecting the positions of the peripheral vehicles V1, V2, and V3 using the radar module 171, the driver assistance system 170 transmits a detection radio wave to the periphery of the vehicle 1 through the radar module 171, and receives reflection radio waves reflected from the peripheral vehicles V1, V2, and V3. Further, the driver assistance system 170 may determine distances between the vehicle 1 and the peripheral vehicles V1, V2, and V3 and directions of the peripheral vehicles V1, V2, and V3 based on a reception intensity of the reflection radio wave or a phase difference (or a time difference) between the detection radio wave and the received radio wave.

The driver assistance system 170 may control the radar module 171 so that the first to fourth radar sensors 171a to 171d sequentially transmit the detection radio waves and receive the reflection radio waves.

For example, the driver assistance system 170 may control the radar module 171 so that the first radar sensor 171a transmits the detection radio wave toward the front of the vehicle 1 and receives the reflection radio wave reflected from the front vehicle. When the first vehicle V1 is located in front of the vehicle 1, as shown in FIG. 13, the first radar sensor 171a may receive the reflection radio wave reflected from the first vehicle V1.

Next, the driver assistance system 170 may control the radar module 171 so that the second radar sensor 171b transmits the detection radio wave toward the rear of the vehicle 1 and receives the reflection radio wave reflected from the rear vehicle. When the second vehicle V2 is located behind the vehicle 1 and the third vehicle V3 is located on the left of the vehicle 1, as shown in FIG. 14, the second radar sensor 171b may receive a first reflection radio wave reflected from the second vehicle V2 and a second reflection radio wave reflected from the third vehicle V3.

Next, the driver assistance system 170 may control the radar module 171 so that the third radar sensor 171c transmits the detection radio wave toward the left of the vehicle 1 and receives the reflection radio wave reflected from the left vehicle. When the third vehicle V3 is located on the left rear of the vehicle 1, as shown in FIG. 15, the third radar sensor 171c may receive a first reflection radio wave reflected from the third vehicle V3.

Next, the driver assistance system 170 may control the radar module 171 so that the fourth radar sensor 171d transmits the detection radio wave toward the right of the vehicle 1 and receives the reflection radio wave reflected from the right vehicle. When the vehicle is not located on the right of the vehicle 1, the fourth radar sensor 171d may not receive the reflection radio wave.

The driver assistance system 170 may determine positions of the peripheral vehicles V1, V2, and V3 located in the periphery of the vehicle 1 based on a reflection radio wave in which the first to fourth radar sensors 171a to 171d receive.

The driver assistance system 170 may determine a position of the first vehicle V1 located in front of the vehicle 1 based on the reflection radio wave received by the first radar sensor 171a, and determine a position of the second vehicle V2 located behind the vehicle 1 based on a first reflection radio wave received by the second radar sensor 171b. Further, the driver assistance system 170 may determine a position of the third vehicle V3 located on the left rear of the vehicle 1 based on a second reflection radio wave received by the second radar sensor 171b and a reflection radio wave received by the third radar sensor 171c.

The driver assistance system 170 which detects the positions of the peripheral vehicles V1, V2, and V3 transmits the position information on the peripheral vehicles V1, V2, and V3 to the wireless communication device 200 through the NT.

The wireless communication device 200 may determine the positions of the peripheral vehicles V1, V2, and V3 based on the position information received from the driver assistance system 170.

After this, the target vehicle is selected. Specifically, the target vehicle may be selected by the vehicle 1 or the driver.

When the electronic device 100 included in the vehicle 1 requests to communicate with the peripheral vehicles V1, V2, and V3, information on the target vehicle may be included in the communication request transmitted by the electronic device 100. For example, when a malfunction occurs in the brake apparatus of the vehicle 1 and the communication request is received from the brake control apparatus 150, the target vehicle may be a vehicle located behind the vehicle 1.

Further, when the driver orders communication with the peripheral vehicles V1, V2, and V3 through the AVN device 110, etc., the vehicle 1 may display the peripheral vehicles V1, V2, and V3 to the driver through the input and output control system 120, and receive the target vehicle selected by the driver.

For example, as shown in FIG. 16, the vehicle 1 may display a position information image 500 which indicates the peripheral vehicles V1, V2, and V3 through the AVN display unit 111 of the AVN device 110. The position information image 500 may include vehicle icons IC1, IC2, and IC3 which indicates the peripheral vehicles V1, V2, and V3 located in the periphery of the vehicle 1. The driver may select the target vehicle by selecting any one of the vehicle icons IC1, IC2, and IC3 included in the position information image 500.

Specifically, the wireless communication device 200 may request the AVN device 110 to display the position information image 500 which indicates the position information of the peripheral vehicles V1, V2, and V3 on the AVN display unit 111 or the cluster display unit 121. When the driver touches an icon of the target vehicle among vehicle icons IC1, IC2, and IC3 included in the position information image 500, the AVN device 110 may transmit information on the target vehicle to the wireless communication device 200.

In another example, as shown in FIG. 17, the vehicle 1 may display the position information image 500 which indicates the position information of the peripheral vehicles V1, V2, and V3 through the cluster display unit 121. The position information image 500 may include the icons IC1, IC2, and IC3 corresponding to the peripheral vehicles V1, V2, and V3 located in the periphery of the vehicle 1. The driver may select the target vehicle by selecting any one of the icons IC1, IC2, and IC3 included in the position information image 500.

The wireless communication device 200 may request the input and output control system 120 to display the position information image 500 on the cluster display unit 121. The driver may select an icon corresponding to the target vehicle among the icons IC1, IC2, and IC3 included in the position information image 500 using the wheel button module 123 provided in the steering wheel 60. When the driver selects the target vehicle, the input and output control system 120 may transmit information on the target vehicle to the wireless communication device 200.

Alternatively, the vehicle 1 may select the target vehicle through various methods using a voice, a motion, etc. of the driver.

When the target vehicle is selected ("Yes" in operation S1020), the vehicle 1 may prepare a communication with the target vehicle (S1030).

In detail, the wireless communication device 200 of the vehicle 1 may form the beam pattern BP according to the position of the target vehicle.

Figure 18:
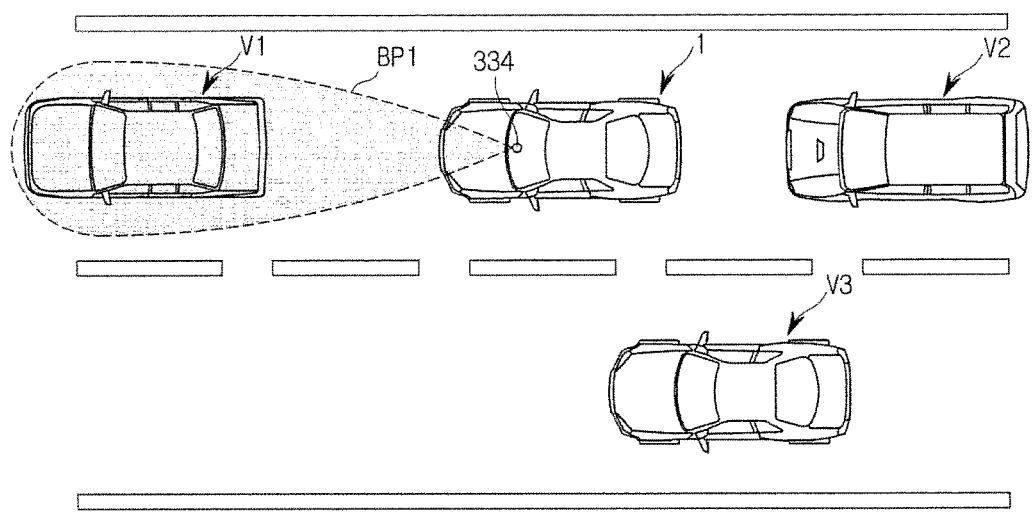
FIGS. 18 through 23 are diagrams illustrating an example of forming a beam pattern according to the communication method shown in FIG. 9.

For example, when the first vehicle V1 located in front of the vehicle 1 is selected as the target vehicle, as shown in FIG. 18, the wireless communication device 200 may generate a first beam pattern BP1 covering the first vehicle V1. Specifically, the wireless communication device 200 may determine the main direction θ which is toward the first vehicle V1, and control the phase difference Δφ through the phase converter 332 in order to form the first beam pattern BP1 in which the main direction θ is toward the first vehicle V1.

When the first beam pattern BP1 is formed, the vehicle 1 may selectively perform the communication with the first vehicle V1 among the peripheral vehicles V1, V2, and V3, and the second and third vehicles V2 and V3 may not receive information from the vehicle 1.

Figure 19:
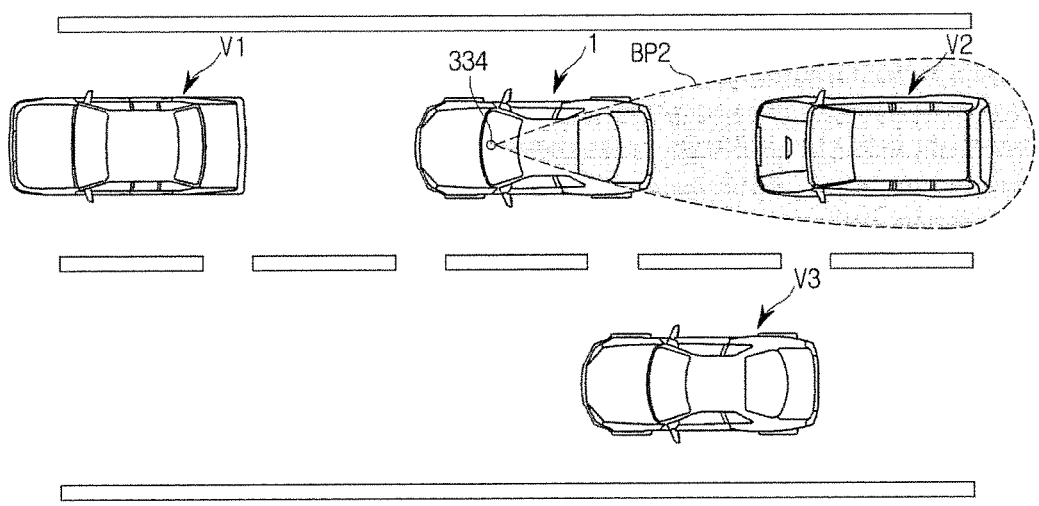

In another example, when the second vehicle V2 located behind the vehicle 1 is selected as the target vehicle, as shown in FIG. 19, the wireless communication device 200 may generate a second beam pattern BP2 covering the second vehicle V2. The wireless communication device 200 may determine the main direction θ which is toward the second vehicle V2, and control the phase difference Δφ through the phase converter 332 in order to form the second beam pattern BP2 in which the main direction θ is toward the second vehicle V2.

When the second beam pattern BP2 is formed, the vehicle 1 may selectively perform the communication with the second vehicle V2 among the peripheral vehicles V1, V2, and V3, and the first and third vehicles V1 and V3 may not receive information from the vehicle 1.

Figure 20:
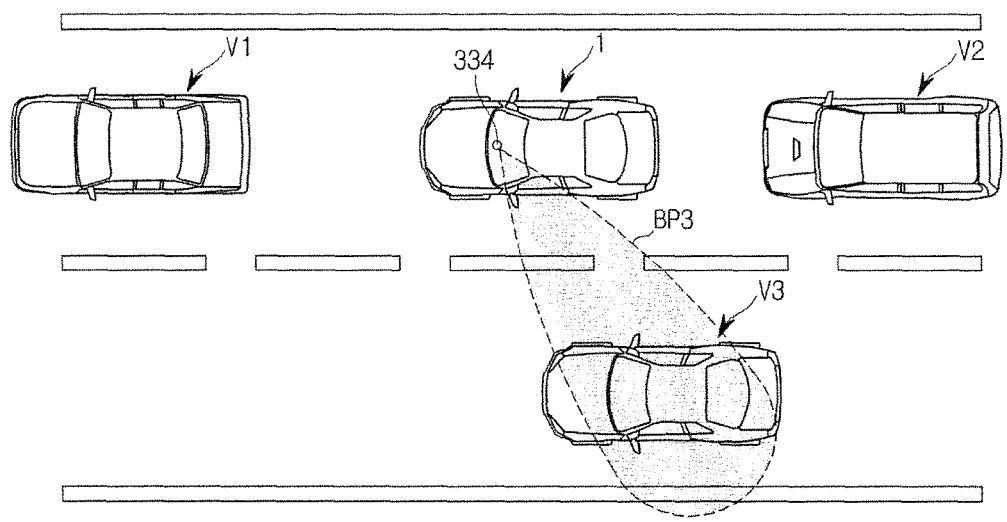

In still another example, when the third vehicle V3 located on the left rear of the vehicle 1 is selected as the target vehicle, as shown in FIG. 20, the wireless communication device 200 may generate a third beam pattern BP3 covering the third vehicle V3. The wireless communication device 200 may determine the main direction θ which is toward the third vehicle V3, and control the phase difference Δφ through the phase converter 332 in order to form the third beam pattern BP3 in which the main direction θ is toward the third vehicle V3.

When the third beam pattern BP3 is formed, the vehicle 1 may selectively perform the communication with the third vehicle V3 among the peripheral vehicles V1, V2, and V3, and the second and third vehicles V2 and V3 may not receive information from the vehicle 1.

Further, a plurality of target vehicles may be selected.

Figure 21:
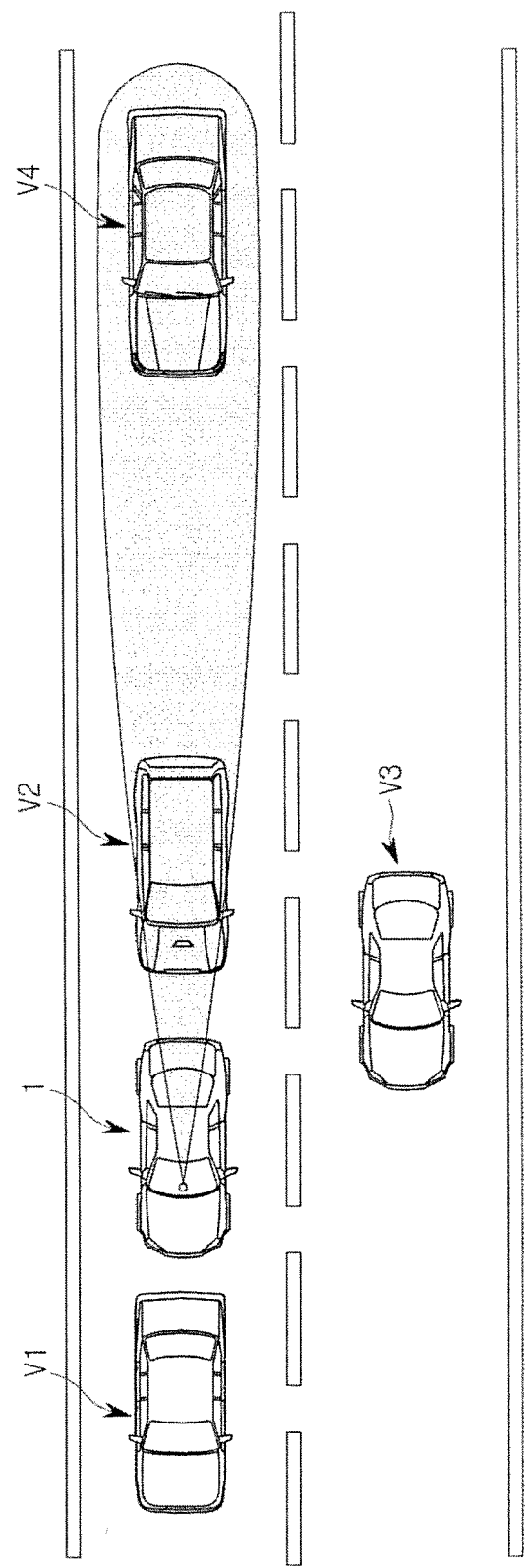

For example, when the vehicles including the second vehicle V2 located behind the vehicle 1 are selected, as shown in FIG. 21, the wireless communication device 200 may generate the second beam pattern BP2 covering a fourth vehicle V4 as well as the second vehicle V2 located behind the vehicle 1. The wireless communication device 200 may determine the main direction θ which is toward the rear of the vehicle 1, and control the phase difference Δφ through the phase converter 332 in order to form the second beam pattern BP2 in which the main direction θ is toward the rear of the vehicle 1. Further, the wireless communication device 200 may control a gain of the variable gain amplifier 333 in order to form the second beam pattern BP2 having a maximum size.

Figure 22:
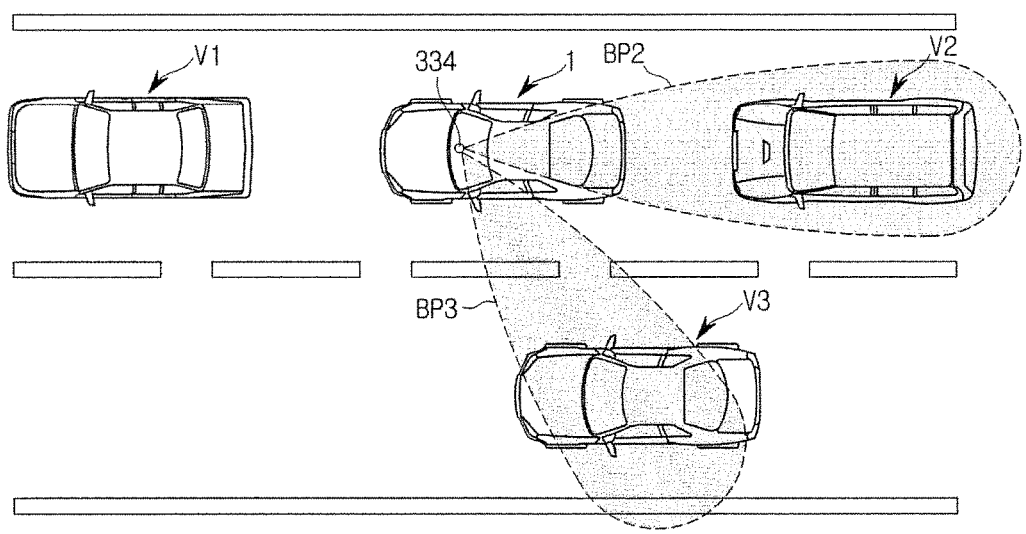

In yet another example, when the second and third vehicles V2 and V3 are selected as the target vehicles, as shown in FIG. 22, the wireless communication device 200 may generate the second beam pattern BP2 and the third beam pattern BP3. Specifically, the wireless communication device 200 may divide a time, and periodically repeat the generation of the second beam pattern BP2 and the generation of the third beam pattern BP3.

As a result, the vehicle 1 may perform the communication with the second vehicle V2 and the third vehicle V3 at the same time.

Then, the vehicle 1 transmits information to the target vehicle (S1040).

The wireless communication device 200 of the vehicle 1 may transmit a variety of information to the target vehicle.

For example, when a malfunction occurs in the brake apparatus of the vehicle 1, the wireless communication device 200 may transmit information on the malfunction in the brake apparatus of the vehicle 1 to the vehicle located behind the vehicle 1 by a request of the brake control apparatus 150.

Also, when the vehicle 1 changes the lanes, the wireless communication device 200 may transmit information on the lane change to the vehicle located on the left or right rear of the vehicle 1 according to a request of the driver assistance system 170.

Further, when a collision with the front vehicle is expected, the wireless communication device 200 may transmit warning information on the collision with the front vehicle to the vehicle located behind the vehicle 1 according to the request of the driver assistance system 170.

Moreover, when a driving obstacle which obstructs the driving of the vehicle 1 is found, the wireless communication device 200 may transmit information on the discovery of the driving obstacle to the vehicle located behind the vehicle 1 according to the request of the driver assistance system 170.

In addtion, when the driver transceives a message with a driver of the target vehicle through the AVN device 110, the wireless communication device 200 may transmit information including the message of the driver to the target vehicle according to the request of the AVN device 110.

As such, the information transmitted to the target vehicle may include information on a road on which the vehicle 1 is driven, information on traffic conditions of the road on which the vehicle 1 is driven, information on a message of the driver, etc., as well as information on an operation of the vehicle 1. Further, the information transmitted to the target vehicle may have various formats such as sound, a character, and an image.

When the target vehicle is not selected ("No" in operation S1020), the vehicle 1 may prepare the communication with the peripheral vehicles V1, V2, and V3 (S1050).

The wireless communication device 200 of the vehicle 1 may form an omnidirectional beam pattern BP.

Figure 23:
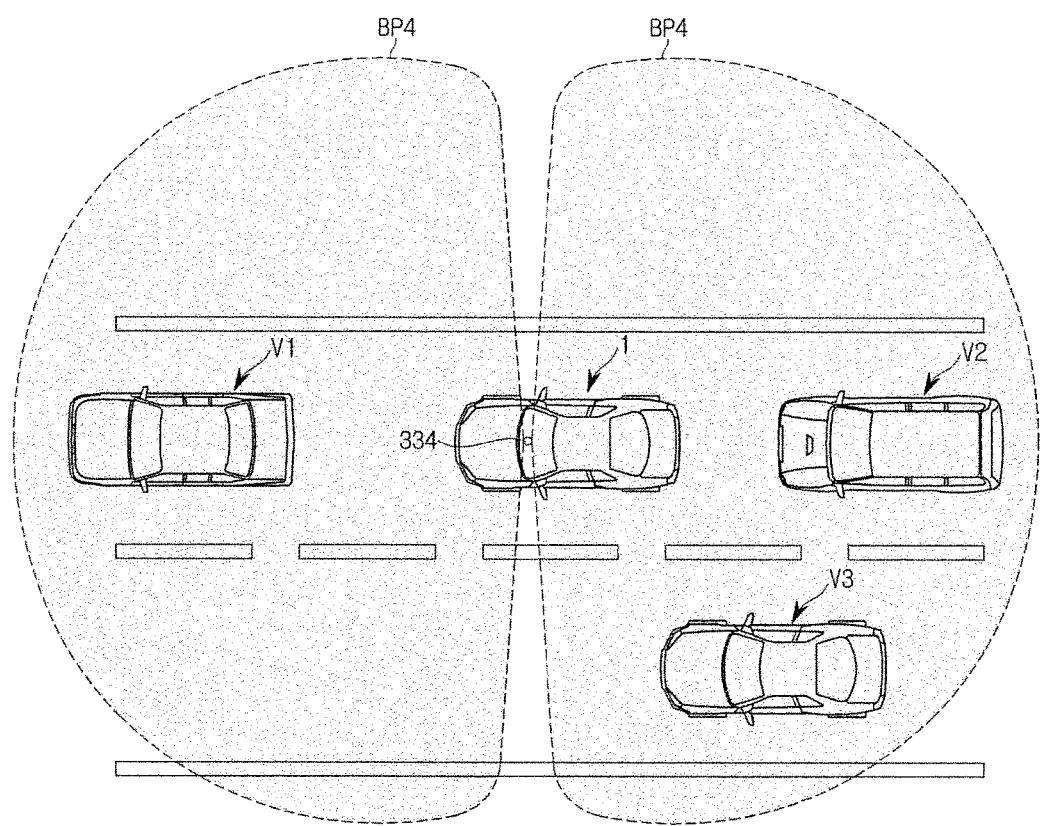

For example, when the target vehicle is not selected and information is transmitted to all peripheral vehicles V1, V2, and V3, as shown in FIG. 23, the wireless communication device 200 may form an omnidirectional beam pattern BP4. In detail, the wireless communication control module 310 of the wireless communication device 200 may not generate the phase difference Δφ through the phase converter 332.

When the omnidirectional beam pattern BP4 is formed, the vehicle 1 may communicate with all peripheral vehicles V1, V2, and V3. In other words, the vehicle 1 may broadcast information to all peripheral vehicles V1, V2, and V3.

After this, the vehicle 1 transmits information to the peripheral vehicles V1, V2, and V3 (S1060).

The wireless communication device 200 of the vehicle 1 may transmit a variety of information to the peripheral vehicles V1, V2, and V3.

For example, when a malfunction occurs in an engine of the vehicle 1, the wireless communication device 200 may broadcast information on the malfunction in the engine to all peripheral vehicles V1, V2, and V3 according to a request of the engine control system 130.

As such, the information transmitted to all peripheral vehicles V1, V2, and V3 may include emergency information on the driving of the vehicle 1. Further, information transmitted to the target vehicle may have various formats such as sound, a character, or an image, etc.

As described above, the vehicle 1 may selectively provide information to the vehicle selected by the driver or automatically selected using beam forming characteristics of the array antenna.

Figure 24:
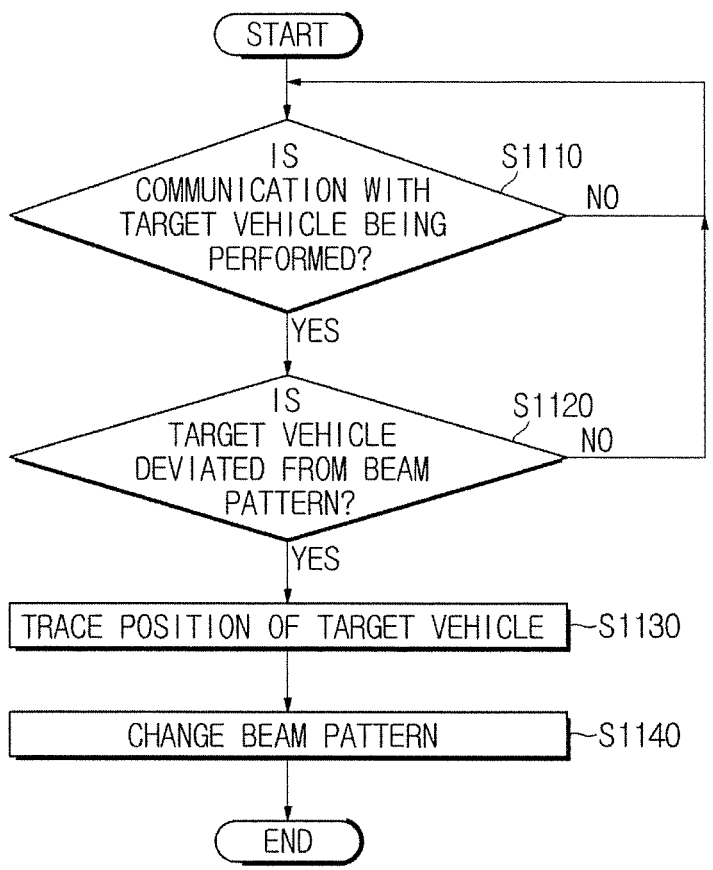
FIG. 24 is a diagram illustrating another example of a communication method of a vehicle according to an embodiment of the present invention.
Figure 25:
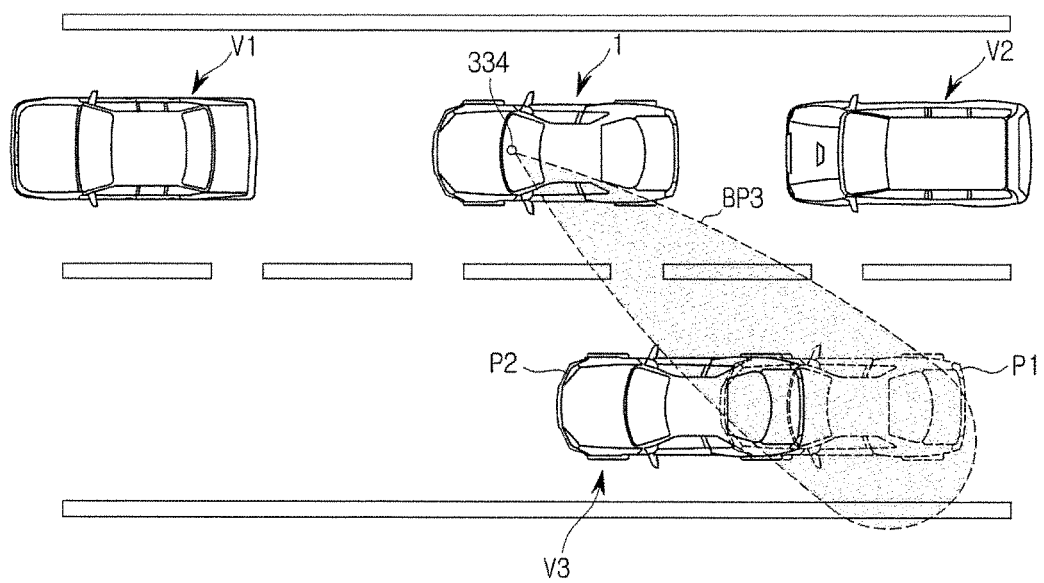
FIG. 25 is a diagram illustrating an example in which a position of a target vehicle is changed.
Figure 26:
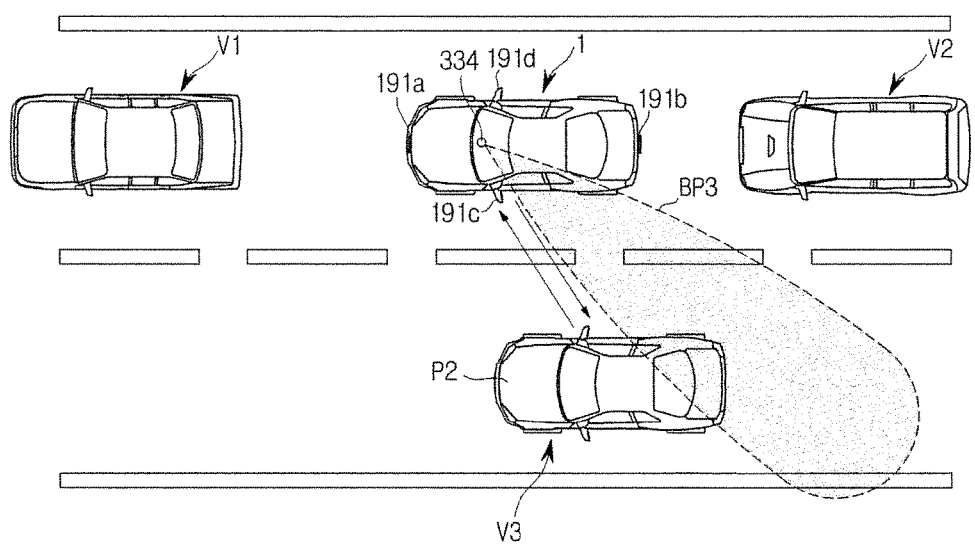
FIG. 26 is a diagram illustrating an example of tracing a position of a target vehicle according to the communication method shown in FIG. 24.
Figure 27:
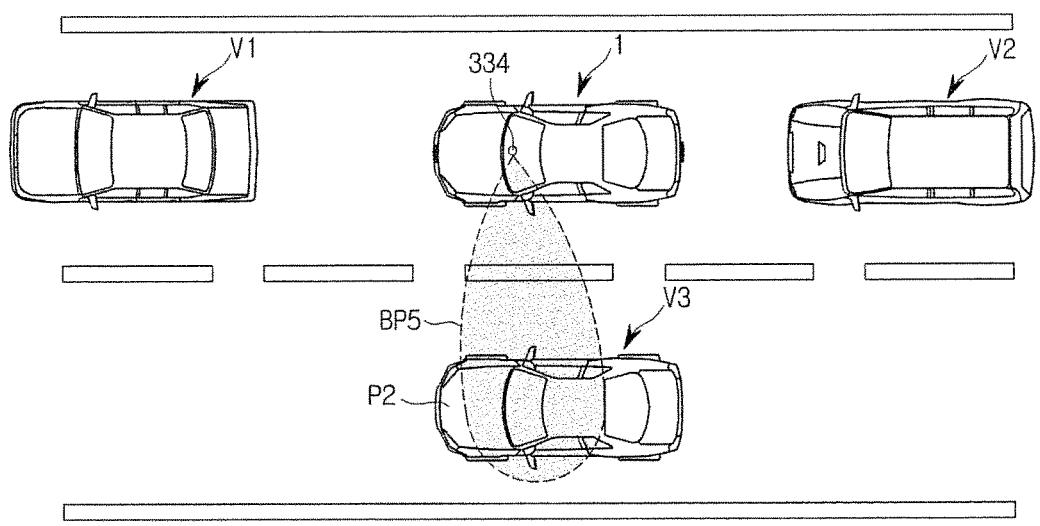
FIG. 27 is a diagram illustrating an example of reforming a beam pattern according to the communication method shown in FIG. 24.

FIG. 24 is a diagram illustrating another example of a communication method of a vehicle according to an embodiment of the present invention, FIG. 25 is a diagram illustrating an example in which a position of a target vehicle is changed, FIG. 26 is a diagram illustrating an example of tracing the position of the target vehicle according to the communication method shown in FIG. 24, and FIG. 27 is a diagram illustrating an example of reforming a beam pattern according to the communication method shown in FIG. 24.

Hereinafter, a method 1100 in which the vehicle 1 maintains communication with the target vehicle will be described with reference to FIGS. 24 through 27.

The vehicle 1 determines whether it is in communication with the target vehicle (S1110).

The vehicle 1 may communicate with the target vehicle for various reasons. For example, when the driver orders the communication with the target vehicle or when transmitting operation information on the vehicle 1 to the target vehicle, the vehicle 1 may communicate with the target vehicle.

Further, the vehicle 1 may form the beam pattern BP for the communication with the target vehicle. Specifically, the vehicle 1 may detect a position of the target vehicle, and form the beam pattern BP according to the position of the target vehicle.

When it is not in communication with the target vehicle ("No" in operation S1110), the vehicle 1 continues an operation which is being performed.

Further, when it is in communication with the target vehicle ("Yes" in operation S1110), the vehicle 1 determines whether the target vehicle is deviated from the beam pattern (S1120).

The vehicle 1 may determine whether the target vehicle is deviated from the beam pattern using the wireless communication device 200.

When a relative position of the target vehicle with respect to the vehicle 1 is changed, the target vehicle may be deviated from the beam pattern BP. When the target vehicle is deviated from the beam pattern BP, the communication between the vehicle 1 and the target vehicle may be disconnected.

For the reason described above, the vehicle 1 may determine whether the target vehicle is deviated from the beam pattern BP through various methods.

For example, as shown in FIG. 25, a third beam pattern BP may be formed to communicate with the third vehicle V3 located in a first position P1. At this time, when the third vehicle V3 moves from the first position P1 to a second position P2, the third vehicle V3 may be deviated from the third beam pattern BP3.

When the target vehicle is deviated from the beam pattern, the intensity of the wireless signal in which the vehicle 1 transmits to the target vehicle is decreased, and the intensity of the wireless signal of the vehicle 1 received from the target vehicle is also decreased.

For the reason described above, the wireless communication device 200 may detect the intensity of the wireless signal received from the target vehicle, and determine whether the target vehicle is deviated from the beam pattern based on the intensity of the detected wireless signal.

When the intensity of the communication signal is less than a predetermined value, the wireless communication device 200 may determine that the target vehicle is deviated from the beam pattern, and when the intensity of the communication signal is greater than the predetermined value, the wireless communication device 200 may determine that the target vehicle is located inside the beam pattern.

When the target vehicle is not deviated from the beam pattern ("No" in operation S1120), the vehicle 1 continues the communication with the target vehicle.

Further, when it is determined that the target vehicle is deviated from the beam pattern ("Yes" in operation S1120), the vehicle detects the position of the target vehicle once again (S1130).

Specifically, the vehicle 1 may once again detect the position of the target vehicle using the driver assistance system 170. When it is determined that the target vehicle is deviated from the beam pattern, the wireless communication device 200 may transmit a position detection request of the target vehicle to the driver assistance system 170 through the NT.

The driver assistance system 170 may once again detect the position of the target vehicle using the radar module 171 (i.e., 171a, 171b, 171c, 171d), or an ultrasonic sensor module (not shown). In particular, the driver assistance system 170 may once again detect a new position of the target vehicle based on a previous position of the target vehicle.

When the vehicle continuously moves, the new position of the target vehicle may not be significantly different from an initial position even when the target vehicle is deviated from the beam pattern.

For example, as shown in FIG. 26, even when the third vehicle V3 which is the target vehicle moves from the first position P1 to the second position P2, the second position P2 in which the third vehicle V3 is currently located may not be significantly deviated from the first position P1.

Using this, the driver assistance system 170 may detect the new position of the target vehicle using the radar sensor corresponding to the previous position of the target vehicle. According to an example shown in FIG. 26, the driver assistance system 170 may detect the third vehicle V3 located in the second position P2 using the third radar sensor 171c corresponding to the first position P1.

When the position of the target vehicle is detected, the driver assistance system 170 may transmit position information including the position of the target vehicle to the wireless communication device 200.

As another example, the vehicle 1 may obtain an image of the target vehicle using an external camera (not shown) when the target vehicle is selected. After this, when the target vehicle is deviated from the beam pattern, the vehicle 1 may once again detect the positions of the peripheral vehicles V1, V2, and V3, obtain images of the peripheral vehicles V1, V2, and V3, and compare the obtained images of the peripheral vehicles V1, V2, and V3 and the image of the target vehicle. Further, the vehicle 1 may distinguish the target vehicle from other peripheral vehicles V1 and V2 based on a comparison result of the images of the peripheral vehicles V1, V2, and V3 and the image of the target vehicle, and determine the position of the target vehicle.

After once again detecting the position of the target vehicle, the vehicle 1 may change the beam pattern BP (S1140).

The wireless communication device 200 of the vehicle 1 may form the beam pattern BP according to the new position of the target vehicle.

For example, when the third vehicle V3 located in the second position P2 is detected, as shown in FIG. 27, the wireless communication device 200 may determine the main direction θ of the beam pattern so that the beam pattern covers the third vehicle V3 located in the second position P2. The main direction θ of the beam pattern BP may be toward the second position P2 in which the third vehicle V3 is located. Specifically, the wireless communication control module 310 of the wireless communication device 200 may control the phase difference Δφ through the phase converter 332 to form a fifth beam pattern BP5 in which the main direction θ is toward the second position P2. When the fifth beam pattern BP5 is formed, the vehicle 1 may continue the communication with the third vehicle V3.

As described above, when the target vehicle is deviated from the beam pattern while communicating with the target vehicle, the vehicle 1 may once again detect the position of the target vehicle, and form a new beam pattern corresponding to the position of the target vehicle which is once again detected.

Figure 28:
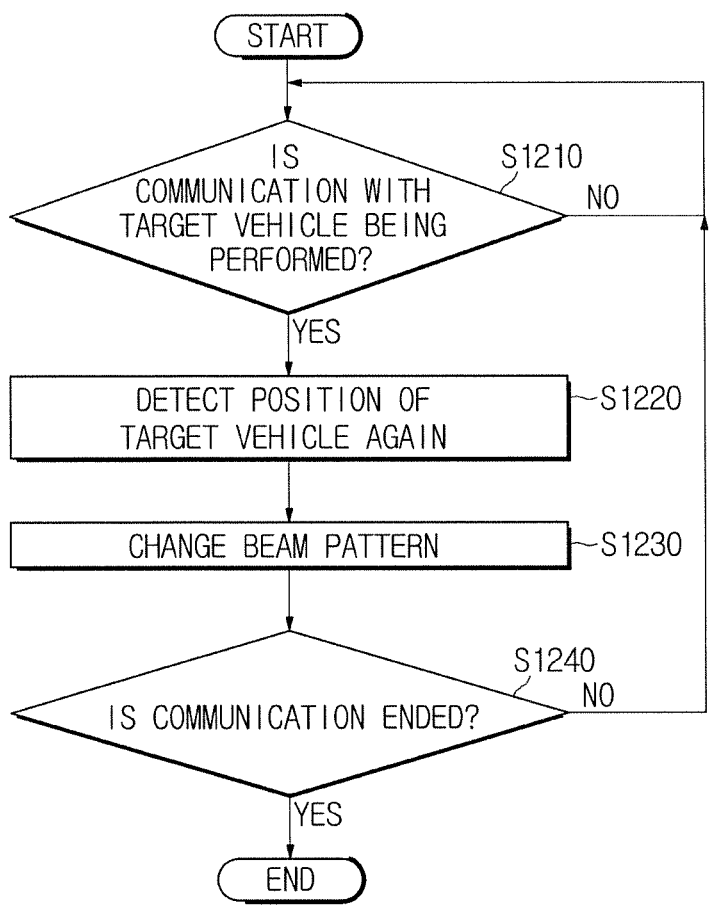
FIG. 28 is a diagram illustrating still another example of a communication method of a vehicle according to an embodiment of the present invention.
Figure 29:
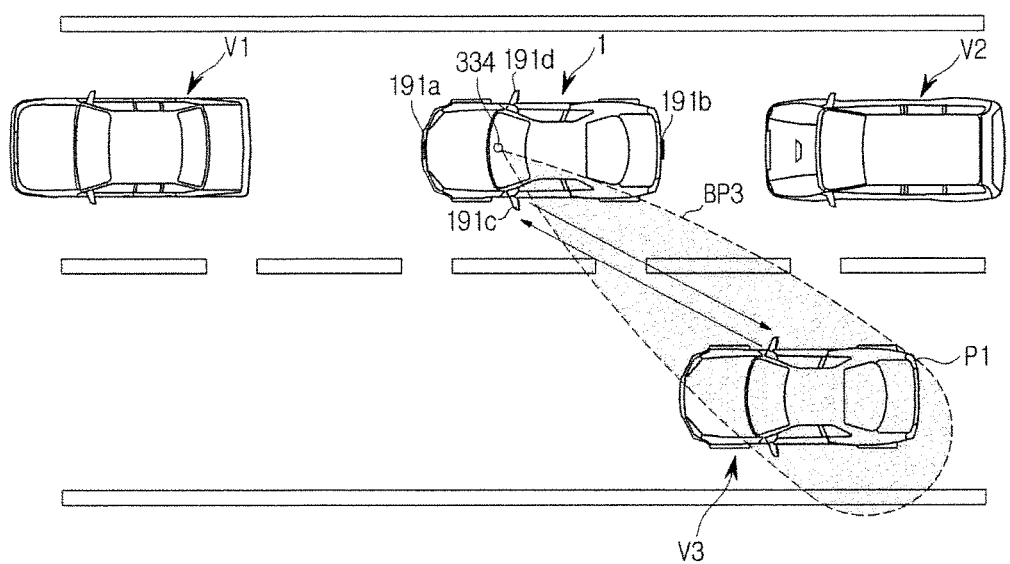
FIGS. 29 through 31 are diagrams illustrating an example of reforming a beam pattern according to the communication method shown in FIG. 28.
Figure 30:
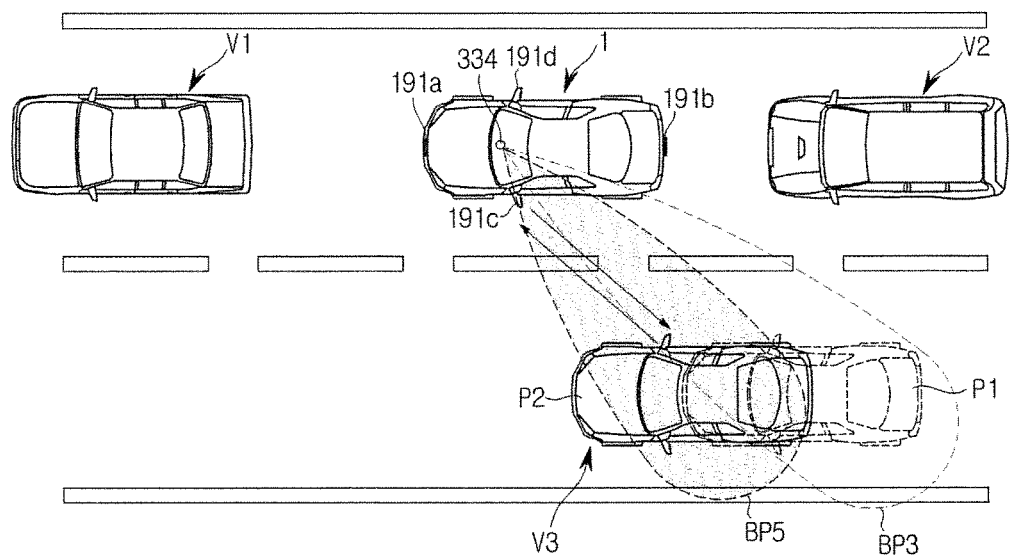
Figure 31:
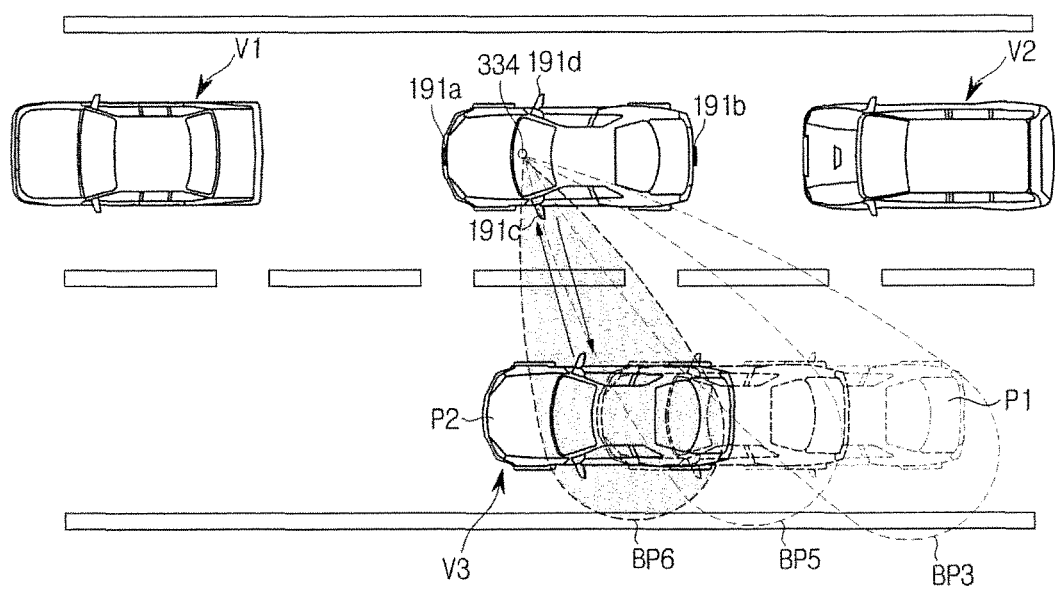

FIG. 28 is a diagram illustrating still another example of a communication method of a vehicle according to an embodiment of the present invention, and FIGS. 29, 30, and 31 are diagrams illustrating an example of reforming a beam pattern according to the communication method shown in FIG. 28.

Hereinafter, a method 1200 in which the vehicle 1 maintains communication with a target vehicle will be described with reference to FIGS. 28 to 31.

The vehicle 1 determines whether it is in communication with the target vehicle (operation S1210).

The vehicle 1 may communicate with the target vehicle for various reasons. For example, when the driver orders the communication with the target vehicle or when transmitting operation information of the vehicle 1 to the target vehicle, the vehicle 1 may communicate with the target vehicle.

Further, the vehicle 1 may form the beam pattern BP for the communication with the target vehicle. In detail, the vehicle 1 may detect a position of the target vehicle, and form the beam pattern BP according to the position of the target vehicle.

When it is not in communication with the target vehicle ("No" in operation S1210), the vehicle 1 continues an operation which is being performed.

Further, when it is in communication with the target vehicle ("Yes" in operation S1210), the vehicle 1 detects the position of the target vehicle once again (S1220).

The vehicle 1 may once again detect the position of the target vehicle using the driver assistance system 170.

The driver assistance system 170 may once again detect the position of the target vehicle using the radar module 171 (i.e., 171a, 171b, 171c, 171d), or the ultrasonic sensor module (not shown). Specifically, the driver assistance system 170 may once again detect a new position of the target vehicle based on a previous position of the target vehicle.

When the vehicle continuously moves, the new position of the target vehicle may not be significantly different from an initial position even when the target vehicle is deviated from the beam pattern. Using this, the driver assistance system 170 may detect the new position of the target vehicle using the radar sensor corresponding to the previous position of the target vehicle.

For example, as shown in FIG. 29, the driver assistance system 170 may detect the third vehicle V3 located in the first position P1 using the third radar sensor 171c.

After this, as shown in FIG. 30, the driver assistance system 170 may detect the third vehicle V3 which moves from the first position P1 to the second position P2 using the third radar sensor 171c.

After this, as shown in FIG. 31, the driver assistance system 170 may detect the third vehicle V3 which moves from the second position P2 to the third position P3 using the third radar sensor 171c.

The driver assistance system 170 once again detecting the position of the target vehicle may transmit position information including the new position of the target vehicle to the wireless communication device 200.

After once again detecting the position of the target vehicle, the vehicle 1 changes the beam pattern BP (S1230).

The wireless communication device 200 of the vehicle 1 may form the beam pattern BP according to the new position of the target vehicle.

For example, as shown in FIG. 30, when the third vehicle V3 which is the target vehicle moves from the first position P1 to the second position P2, the wireless communication device 200 may determine the main direction θ of the beam pattern so that the beam pattern covers the third vehicle V3 located in the second position P2, and control the phase difference Δφ through the phase converter 332 in order to form a fifth beam pattern BP5 in which the main direction θ is toward the second position P2.

As shown in FIG. 31, when the third vehicle V3 moves from the second position P2 to the third position P3, the wireless communication device 200 may determine the main direction θ of the beam pattern so that the beam pattern covers the third vehicle V3 located in the third position P3, and control the phase difference Δφ through the phase converter 332 in order to form a sixth beam pattern BP6 in which the main direction θ is toward the third position P3.

After this, the vehicle 1 determines whether the communication with the target vehicle is complete (S1240).

When the communication with the target vehicle is continued ("No" in operation S1240), the vehicle 1 repeats the position detection of the target vehicle and the formation of the beam pattern.

Further, when the communication with the target vehicle is complete ("Yes" in operation S1240), the vehicle 1 stops the formation of the beam pattern.

The vehicle 1 described above may continuously detect the position of the target vehicle while communicating, and change the beam pattern according to the detected position of the target vehicle.

Figure 32:
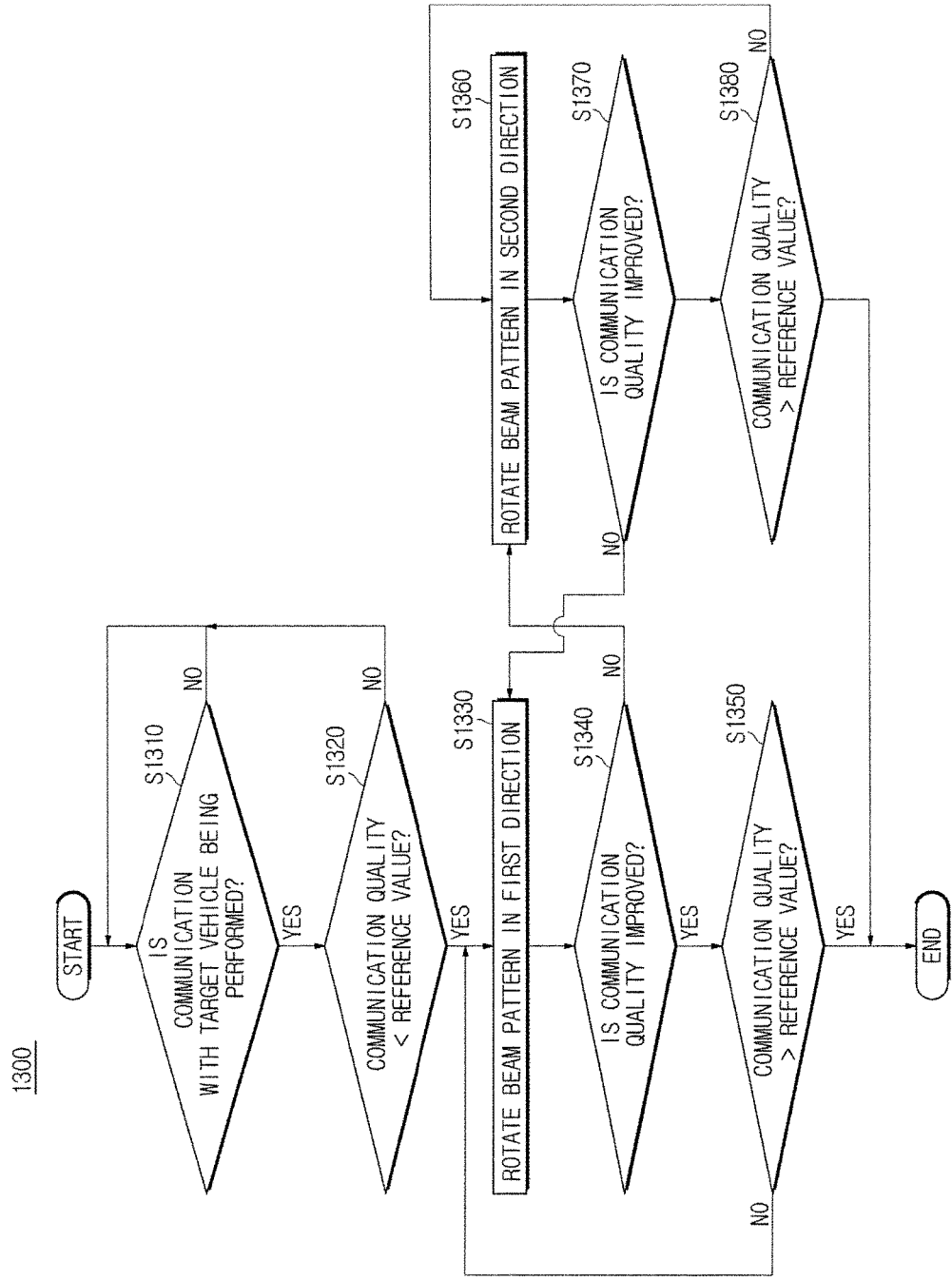
FIG. 32 is a diagram illustrating yet another example of a communication method of a vehicle according to an embodiment of the present invention.

FIG. 32 is a diagram illustrating yet another example of a communication method of a vehicle according to an embodiment of the present invention, and FIGS. 33 through 36 are diagrams illustrating an example of reforming a pattern according to the communication method shown in FIG. 32.

Hereinafter, a method 1300 in which the vehicle 1 maintains communication with a target vehicle will be described with reference to FIGS. 32 through 36.

The vehicle 1 determines whether it is in communication with the target vehicle (operation S1310).

The vehicle 1 may communicate with the target vehicle for various reasons. For example, when the driver orders the communication with the target vehicle or when transmitting the operation information of the vehicle 1 to the target vehicle, the vehicle 1 may communicate with the target vehicle.

Further, the vehicle 1 may form the beam pattern BP for the communication with the target vehicle. In detail, the vehicle 1 may detect a position of the target vehicle, and form the beam pattern BP according to the position of the target vehicle.

When it is not in communication with the target vehicle ("No" in operation S1310), the vehicle 1 continues an operation which is being performed.

Further, when it is in communication with the target vehicle ("Yes" in operation S1310), the vehicle 1 determines whether a communication quality is less than a predetermined value (S1320).

The wireless communication device 200 of the vehicle 1 may evaluate the communication quality through various methods while communicating with the target vehicle. For example, the wireless communication device 200 may evaluate the communication quality based on an intensity of the wireless signal received from the target vehicle, or evaluate the communication quality based on a reception rate of a signal transmitted from the target vehicle.

After this, the wireless communication device 200 may compare the evaluated communication quality with a predetermined reference value. For example, the wireless communication device 200 may compare the intensity of the wireless signal received from the target vehicle with a reference intensity, or compare a transmission rate of data with the target vehicle with a reference transmission rate.

Further, the wireless communication device 200 may determine whether the communication quality is less than the reference value according to the comparison result of the evaluated communication quality and the predetermined reference value.

When the communication quality is greater than or equal to the reference value ("No" in operation S1320), the vehicle 1 continues the communication with the target vehicle.

When the communication quality is less than the reference value ("Yes" in operation S1320), the vehicle 1 rotates the beam pattern BP in a first direction (S1330).

Figure 33:
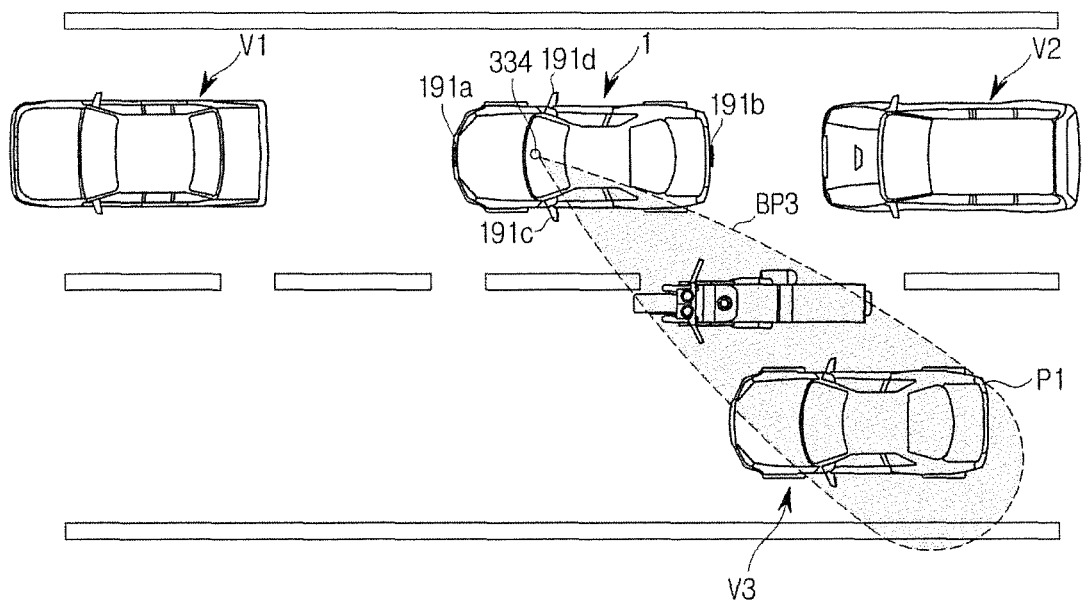
FIGS. 33 through 36 are diagrams illustrating an example of reforming a pattern according to the communication method shown in FIG. 32.

When a relative position of the target vehicle while communicating with the target vehicle is changed, the communication quality with the target vehicle may be degraded. For example, as shown in FIG. 33, the vehicle 1 may form the third beam pattern BP3 to communicate with the third vehicle V3. At this time, when a communication driving obstacle O (for example, another vehicle) between the third vehicle V3 and the vehicle 1 is located, the communication quality between the vehicle 1 and the third vehicle V3 may be degraded.

Figure 34:
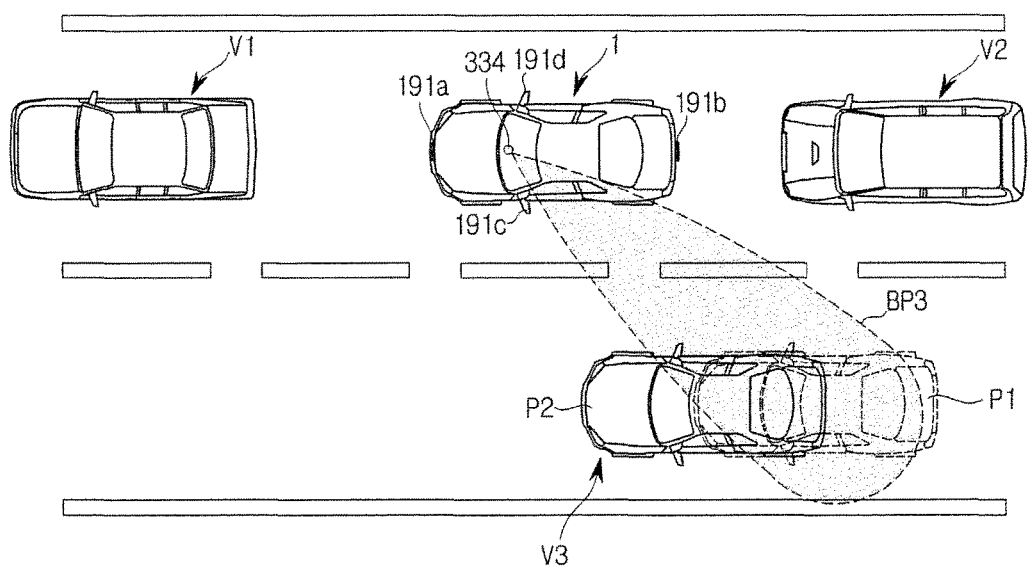

Further, as shown in FIG. 34, the vehicle 1 may form the third beam pattern BP to communicate with the third vehicle V3 located in the first position P1. At this time, when the third vehicle V3 moves from the first position P1 to the second position P2, the communication quality between the vehicle 1 and the third vehicle V3 may be degraded.

Hereinafter, in order to facilitate an understanding, it is assumed that the target vehicle moves and the communication quality is degraded.

As such, when the communication quality is degraded and is less than the reference value, the wireless communication device 200 of the vehicle 1 may rotate the beam pattern in a first direction to improve the communication quality. The wireless communication device 200 may control the phase difference $\Delta\varphi$ between unit antennas 334*a* to 334*h* to rotate the main direction $\theta$ of the beam pattern in the first direction.

Figure 35:
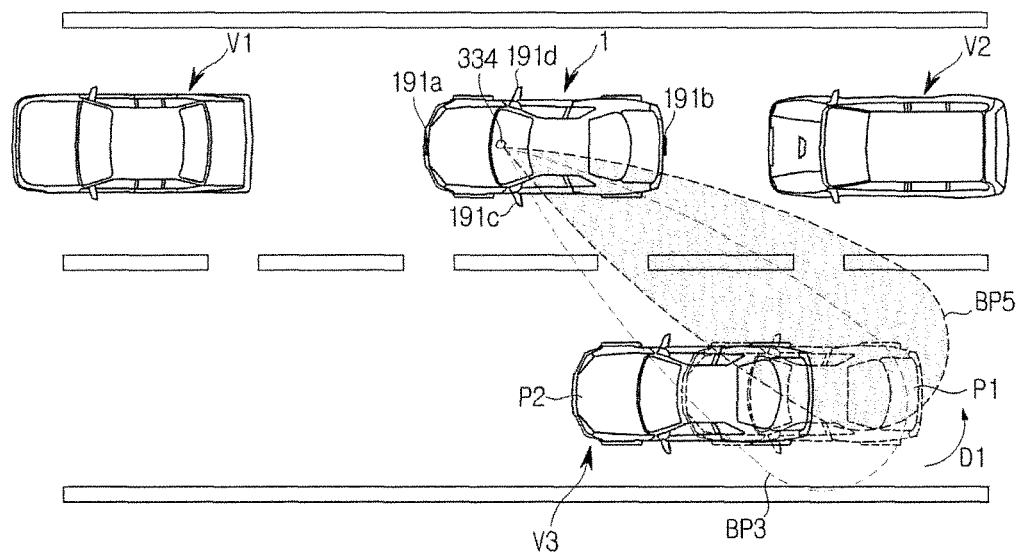

For example, as shown in FIG. 35, the wireless communication device 200 may form the fifth beam pattern BP5 in which the third beam pattern BP3 is rotated in the first direction D1.

After this, the vehicle 1 determines whether the communication quality is improved (S1340).

The wireless communication device 200 of the vehicle 1 may once again evaluate a communication quality after rotating the beam pattern in the first direction. After this, the wireless communication device 200 may compare the communication quality before rotating the beam pattern and the communication quality after rotating the beam pattern.

Further, the wireless communication device 200 may determine whether the communication quality is improved according to the comparison result of the communication quality before rotating the beam pattern and the communication quality after rotating the beam pattern.

When it is determined that the communication quality is improved ("Yes" in operation S1340), the vehicle 1 determines whether the communication quality is greater than the reference value (S1350).

The wireless communication device 200 of the vehicle 1 may compare a communication quality evaluated after rotating the beam pattern in the first direction with the predetermined reference value.

Further, the wireless communication device 200 may determine whether the communication quality is greater than the reference value according to the comparison result of the communication quality after rotating the beam pattern in the first direction and the predetermined reference value.

When it is determined that the communication quality is less than or equal to the reference value ("No" in operation S1350), the vehicle 1 repeats the rotation of the beam pattern and the evaluation of the communication quality. Further, when it is determined that the communication quality is greater than the reference value ("Yes" in operation S1350), the vehicle 1 stops an operation of changing the beam pattern for maintaining the communication with the target vehicle.

In operation S1340, when it is determined that the communication quality is not improved ("No" in operation S1340), the vehicle 1 rotates the beam pattern BP in a second direction (S1360).

Even when the beam pattern BP is rotated in the first direction, the wireless communication device 200 may rotate the beam pattern BP in the second direction which is an opposite direction of the first direction when the communication quality is not improved. Specifically, the wireless communication device 200 may control the phase difference $\Delta\varphi$ between the unit antennas 334*a* to 334*d* in order to rotate the main direction $\theta$ of the beam pattern BP in the second direction.

Figure 36:
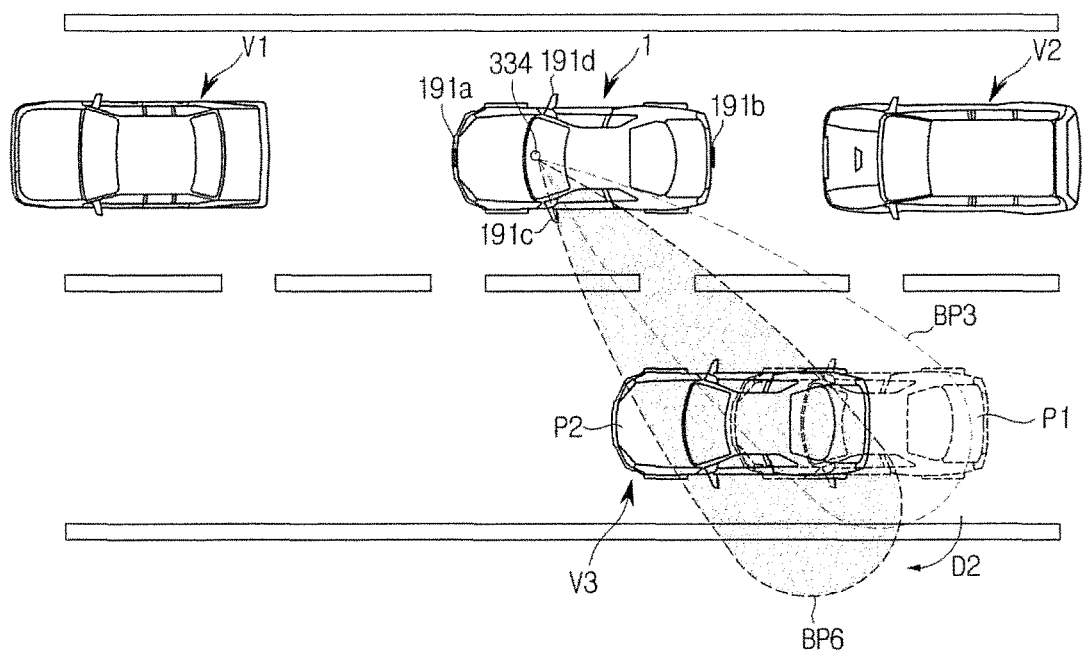

For example, as shown in FIG. 36, the wireless communication device 200 may form a sixth beam pattern BP6 in which the third beam pattern BP3 is rotated in the second direction D2.

After this, the vehicle 1 determines whether the communication quality is improved (S1370).

The wireless communication device 200 of the vehicle 1 may once again evaluate the communication quality after rotating the beam pattern in the second direction. After this, the wireless communication device 200 may compare the communication quality before rotating the beam pattern and the communication quality after rotating the beam pattern.

Further, the wireless communication device 200 may determine whether the communication quality is improved according to the comparison result of the communication quality before rotating the beam pattern and the communication quality after rotating the beam pattern.

When it is determined that the communication quality is improved ("Yes" in operation S1370), the vehicle 1 may determine whether the communication quality is greater than the reference value (S1380).

The wireless communication device 200 of the vehicle 1 may compare the communication quality evaluated after rotating the beam pattern in the second direction with the predetermined reference value.

Further, the wireless communication device 200 may determine whether the communication quality is greater than the reference value according to the comparison result of the communication quality evaluated after rotating the beam pattern and the predetermined reference value.

When it is determined that the communication quality is less than or equal to the reference value ("No" in operation S1380), the vehicle 1 repeats the rotation of the beam pattern and the evaluation of the communication quality. Further, when it is determined that the communication quality is greater than the reference value ("Yes" in operation S1380), the vehicle 1 stops the operation of changing the beam pattern for maintaining the communication with the target vehicle.

In operation S1370, when it is determined that the communication quality is not improved ("No" in operation S1370), the vehicle 1 rotates the beam pattern BP in the first direction (S1330).

That is, the wireless communication device 200 of the vehicle 1 may repeat the rotation of the beam pattern and the evaluation of the communication quality.

As described above, the vehicle 1 may evaluate the communication quality while communicating, and change the beam pattern according to the evaluation result.

Figure 37:
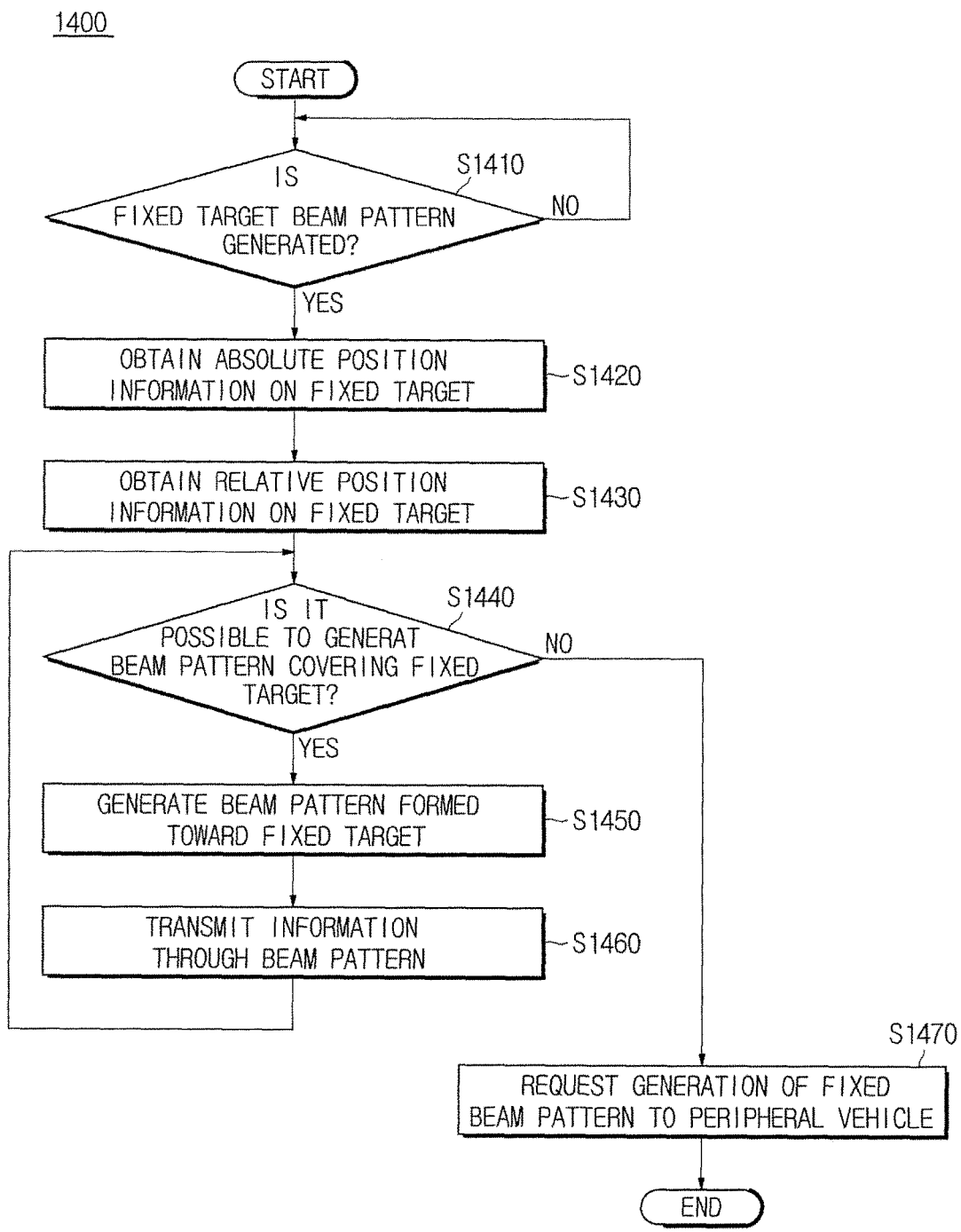
FIG. 37 is a diagram illustrating yet another example of a communication method of a vehicle according to an embodiment of the present invention.

FIG. 37 is a diagram illustrating yet another example of a communication method of a vehicle according to an embodiment of the present invention, and FIGS. 38 through 44 are diagrams illustrating an example of forming a beam pattern according to the communication method shown in FIG. 37.

A method 1400 in which the vehicle 1 forms the beam pattern will be described with reference to FIGS. 37 to 44.

First, the vehicle 1 determines whether to generate a fixed target beam pattern (S1410).

Here, the fixed target beam pattern means a beam pattern formed toward a fixed position. According to the communication method described above, the vehicle 1 forms the beam pattern which is toward the target vehicle, and the target vehicle moves together with the vehicle 1. In other words, the communication method described above forms the beam pattern by targeting a moving target vehicle.

Meanwhile, the fixed target beam pattern of forming the beam pattern toward the fixed position has a difference with the beam pattern formed toward the target vehicle described above.

The vehicle 1 may generate the fixed target beam pattern for various reasons.

Figure 38:
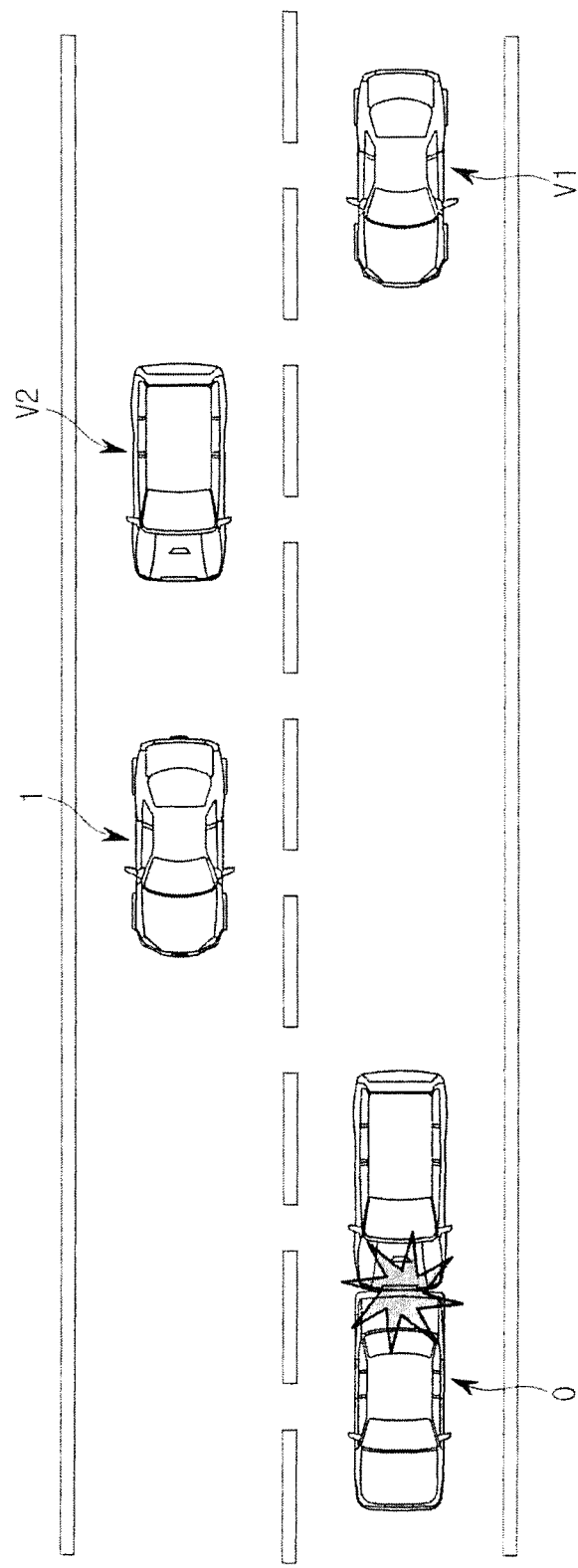
FIGS. 38 through 44 are diagrams illustrating an example of forming a beam pattern according to the communication method shown in FIG. 37.

For example, as shown in FIG. 38, when the driver finds a driving obstacle O which obstructs the driving of another vehicle while driving of the vehicle 1, the vehicle 1 may generate the beam pattern formed toward a fixed position behind the driving obstacle O to inform the driver that there is the driving obstacle O behind the another vehicle and of the position of the driving obstacle O. Here, the driving obstacle O means everything which obstructs the driving of the vehicle on a road such as a rock fall, a vehicle accident, road maintenance, etc.

In another example, when the vehicle 1 receives position information on a fixed target together with a request for generation of the fixed target beam pattern from the external terminal or the peripheral vehicle while driving, the vehicle 1 may generate the fixed target beam pattern formed toward the received position by the request of the external terminal or the peripheral vehicle.

When the vehicle 1 determines to not generate the fixed target beam pattern ("No" in operation S1410), the vehicle 1 continues an operation which is being performed.

Further, when the vehicle 1 determines to generate the fixed target beam pattern ("Yes" in operation S1410), the vehicle 1 obtains absolute position information of the fixed target (S1420).

Here, the absolute position information denotes an absolute coordinate of the fixed target, and includes geographical position information such as a latitude and a longitude, etc.

The vehicle 1 may obtain the absolute position information on the fixed target through various methods.

For example, the vehicle 1 may calculate the absolute position information on the fixed target based on absolute position information on the vehicle 1 and relative position information on the fixed target.

The vehicle 1 may obtain the absolute position information on the vehicle 1 using the GPS module 115 included in the AVN device 110, and obtain the relative position information on the fixed target using the radar module 171 included in the driver assistance system 170.

Figure 39:
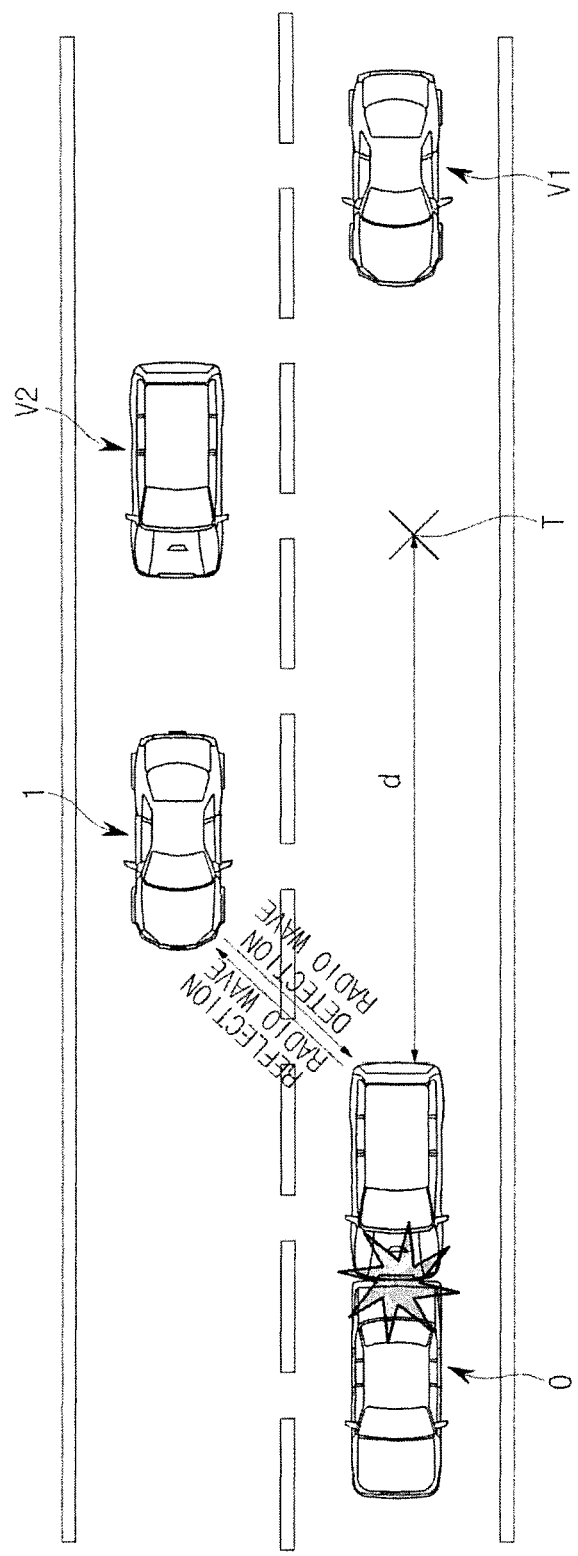

As shown in FIG. 39, when the vehicle 1 finds the driving obstacle O while driving, in order to transmit the presence of the driving obstacle O and the position information on the driving obstacle O to the first vehicle V1 located behind the driving obstacle O, the vehicle 1 may set the fixed target T behind the driving obstacle O, and obtain the position information on the fixed target. At this time, the fixed target T may be separately located in a predetermined safety distance d away from the driving obstacle O in the opposite direction of the driving direction of the vehicle 1.

Specifically, the vehicle 1 may transmit a detection radio wave toward the driving obstacle O using the radar module 171 of the driver assistance system 170, and receive a reflection radio wave reflected from the driving obstacle O. The vehicle 1 may obtain the relative position information of the driving obstacle O including a distance to the driving obstacle O and a direction of the driving obstacle O based on the reflection radio wave received by the radar module 171. Further, the vehicle 1 may obtain the absolute position information on the vehicle 1 using the GPS module 115 of the AVN device 110.

As such, the vehicle 1 which obtains the relative position information of the driving obstacle O and the absolute position information on the vehicle O may obtain the absolute position information of the driving obstacle O.

Further, the vehicle 1 may calculate the absolute position information of the fixed target T based on the absolute position information on the driving obstacle O, the driving direction and the safety distance d of the vehicle 1.

At this time, the driver assistance system 170 of the vehicle 1 may calculate the absolute position information of the fixed target T and transmit the calculated absolute position information to the wireless communication device 200 through the NT, or the wireless communication device 200 may receive related information from the driver assistance system 170 and the AVN device 110 and directly calculate the absolute position information of the fixed target T.

In another example, the vehicle 1 may obtain the absolute position information on the fixed target from the external terminal or the peripheral vehicle. Specifically, the vehicle 1 may obtain the absolute position information on the fixed target from a preceding vehicle which finds the driving obstacle O first, or obtain the absolute position information on the fixed target from the external server, etc. providing information on traffic conditions.

After this, the vehicle 1 obtains the relative position information on the fixed target (S1430).

Here, the relative position information denotes coordinates of the fixed target T in a coordinate system in which the position of the vehicle 1 is set as a starting point. For example, the relative position information on the fixed target T may include a distance of the fixed target T from the wireless communication device 200 of the vehicle 1 and a direction of the fixed target T based on the driving direction of the vehicle 1.

The vehicle 1 may obtain the relative position information on the fixed target through various methods.

For example, the vehicle 1 may calculate the relative position information on the fixed target T based on the absolute position information on the fixed target T which is previously obtained and the absolute position information on the vehicle 1. Further, when the vehicle 1 obtains the absolute position information on the fixed target T using the relative position information on the fixed target T, the vehicle 1 may use the relative position information used for obtaining the absolute position information on the fixed target T as it is.

After this, the vehicle 1 may determine whether it is possible to generate a beam pattern covering the fixed target T (S1440).

Here, the beam pattern that covers the fixed target T means that the intensity of the received radio wave is greater or equal to the predetermined reference intensity when the wireless communication device 200 of the vehicle 1 receives the radio wave of a generated beam pattern at the position of the fixed target T. In other words, it means that the vehicle 1 can clearly receive information to be transmitted through the radio wave of the beam pattern at the position of the fixed target T.

The vehicle 1 may determine whether it is possible to generate the beam pattern covering the fixed target T through various methods.

For example, the vehicle 1 may calculate a reference distance in which the intensity of the radio wave of the beam pattern generated by the wireless communication device 200 is less than the reference intensity, and compare the reference distance and a distance to the fixed target T.

Here, when the reference distance is greater than or equal to the distance to the fixed target T, the vehicle 1 may determine that the beam pattern covers the fixed target T, and when the reference distance is less than the distance to the fixed target T, the vehicle 1 may determine that the beam pattern does not cover the fixed target T.

In another example, the vehicle 1 may determine whether the intensity of the radio wave of the beam pattern generated by the wireless communication device 200 is greater than or equal to the reference intensity at the position of the fixed target T. The vehicle 1 may determine the intensity of the radio wave from the fixed target T based on the intensity of the radio wave in which the wireless communication device 200 outputs, an attenuation ratio of the radio wave in a free space, and the distance to the fixed target T, and compare the determined intensity of the radio wave with the reference intensity.

Here, when the intensity of the radio wave from the fixed target T is greater than or equal to the reference intensity, the vehicle 1 may determine that the beam pattern covers the fixed target T, and when the intensity of the radio wave from the fixed target T is less than the reference intensity, the vehicle 1 may determine that the beam pattern does not cover the fixed target T.

When it is determined that it is possible to generate the beam pattern covering the fixed target ("Yes" in operation S1440), the vehicle 1 may generate the beam pattern formed toward the fixed target T (S1450).

The vehicle 1 may generate the beam pattern according to the relative position of the fixed target T using the wireless communication device 200.

Figure 40:
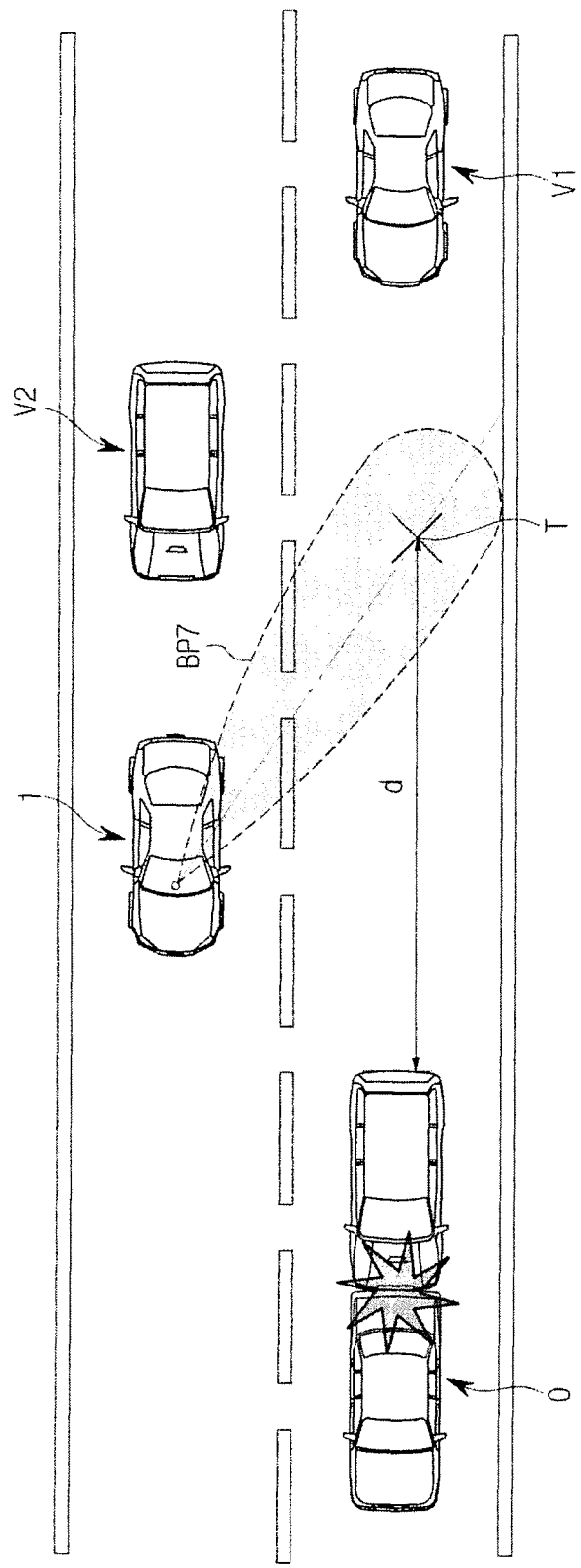

For example, as shown in FIG. 40, when the fixed target T is located on the left rear of the vehicle 1, the vehicle 1 may generate a seventh beam pattern BP formed toward the left rear of the vehicle 1 using the wireless communication device 200. Specifically, the wireless communication device 200 may determine the main direction θ which is toward the fixed target T, and control the phase difference Δφ of the phase converter 332 in order to generate the seventh beam pattern BP7 in which the main direction θ is toward the fixed target T.

Then, the vehicle 1 transmits information through the beam pattern (S1460).

Specifically, the wireless communication device 200 of the vehicle 1 may modulate a carrier wave forming the beam pattern to include information on the driving obstacle O. The information on the driving obstacle O may include the presence of the driving obstacle O and the position information on the driving obstacle O.

A vehicle entering the beam pattern BP may obtain the presence of the driving obstacle O on the driving path and the position information on the driving obstacle O through the wireless signal included in the beam pattern.

Figure 41:
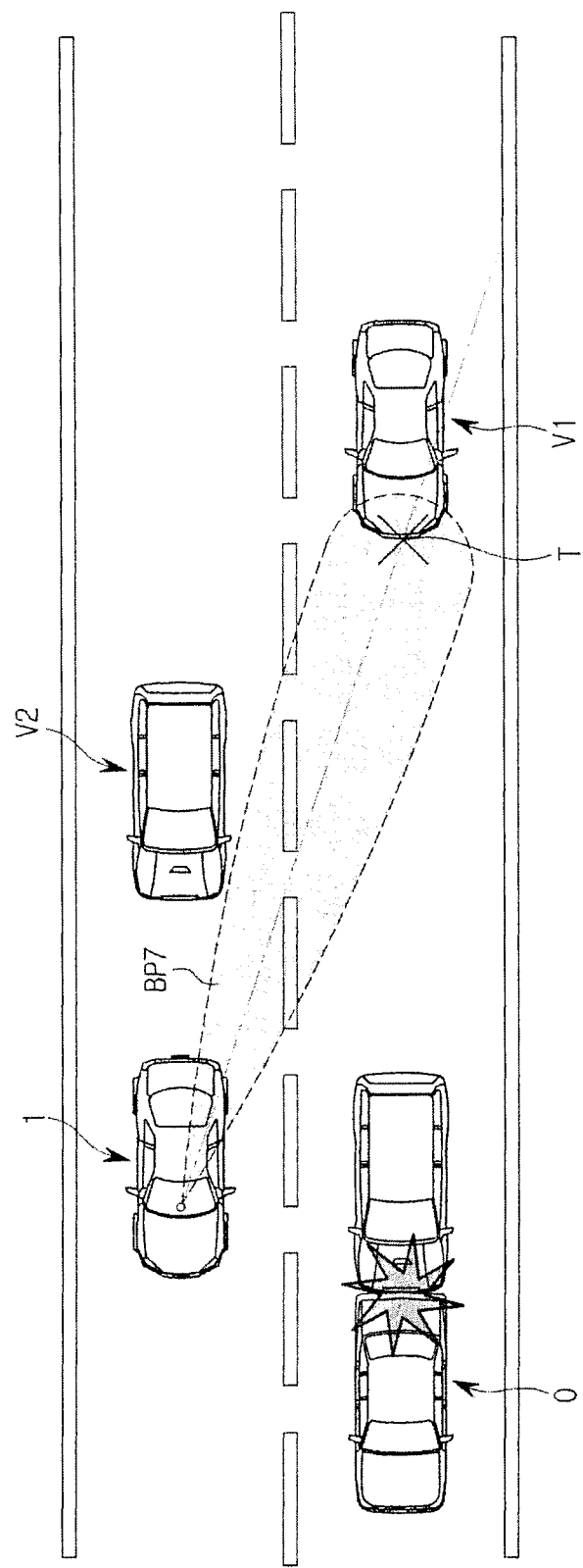

For example, as shown in FIG. 41, the first vehicle V1 which enters into the seventh beam pattern BP7 formed by the vehicle 1 may warn the driver that there is the driving obstacle O on the driving path through the wireless signal included in the beam pattern.

After this, the vehicle 1 reacquires the relative position information on the fixed target T (S1430).

The position of the fixed target T is fixed, whereas since the vehicle 1 is being driven, the relative position of the fixed target T based on the vehicle 1 may be changed according to the driving of the vehicle 1.

For example, as shown in FIGS. 40 and 41, when the fixed target T is located behind the vehicle 1, a distance between the fixed target T and the vehicle 1 becomes gradually great according to the driving of the vehicle 1, and the direction of the fixed target T based on the vehicle 1 may be changed.

For this reason, the vehicle 1 reacquires the relative position of the fixed target T.

The vehicle 1 may obtain the relative position information on the fixed target through various methods.

For example, the vehicle 1 may reacquire the absolute position of the vehicle 1 using the GPS module 115 of the AVN device 110, and calculate the relative position information on the fixed target T based on the absolute position information on the fixed target T and the absolute position information on the vehicle 1 which is reacquired.

After this, the vehicle 1 determines again whether it is possible to generate the beam pattern covering the fixed target (S1440).

As described above, the relative position (particularly, the distance between the vehicle and the fixed target) of the fixed target T is changed according to the driving of the vehicle 1. Accordingly, coverage of the beam pattern formed by the vehicle 1 is changed, and the vehicle 1 determines again whether the fixed target is located within the coverage of the beam pattern.

When it is determined that it is possible to generate the beam pattern covering the fixed target T ("Yes" in operation S1440), the vehicle generates the beam pattern (S1450) again, and transmits information through the beam pattern (S1460).

As such, the vehicle 1 may continuously generate the beam pattern toward the fixed target T, and trailing vehicles may recognize the presence of the driving obstacle O in front of the vehicle 1 and confirm the position of the driving obstacle O by transmitting the presence of the driving obstacle O and the position information on the driving obstacle O.

After this, the vehicle 1 repeats the obtaining of the relative position information on the fixed target T (S1430), the determination of whether it is possible to generate the beam pattern covering the fixed target (S1440), and the generation of the beam pattern (S1450) and the transmission of the information (S1460).

When it is determined that it is not possible to generate the beam pattern covering the fixed target ("No" in operation S1440), the vehicle 1 requests to a peripheral vehicle for the generation of the fixed target beam pattern (S1470).

Figure 42:
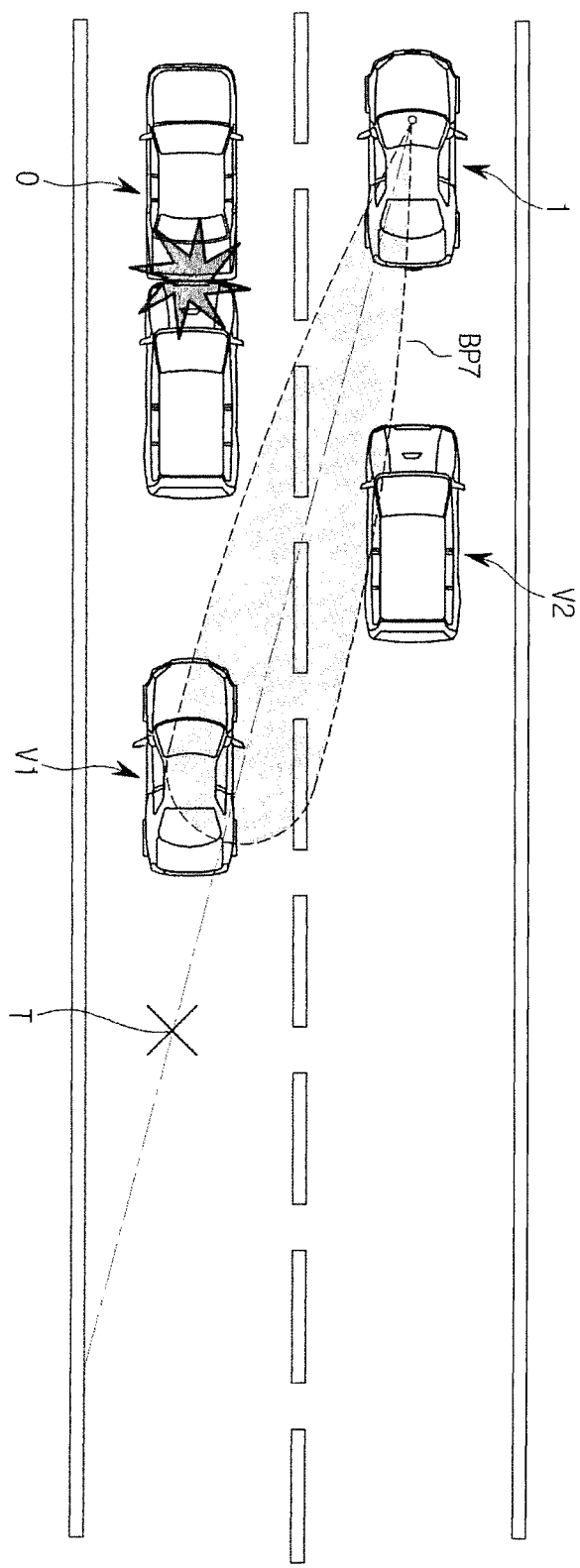

As shown in FIG. 42, the beam pattern generated by the vehicle 1 according to the driving of the vehicle 1 may not reach the fixed target T.

As such, when the beam pattern generated by the vehicle 1 does not reach the fixed target T, in order to continuously transmit information to the fixed target T, the vehicle 1 may request to the peripheral vehicle for the generation of the fixed target beam pattern, and transmit the position information on the fixed target T.

Figure 43:
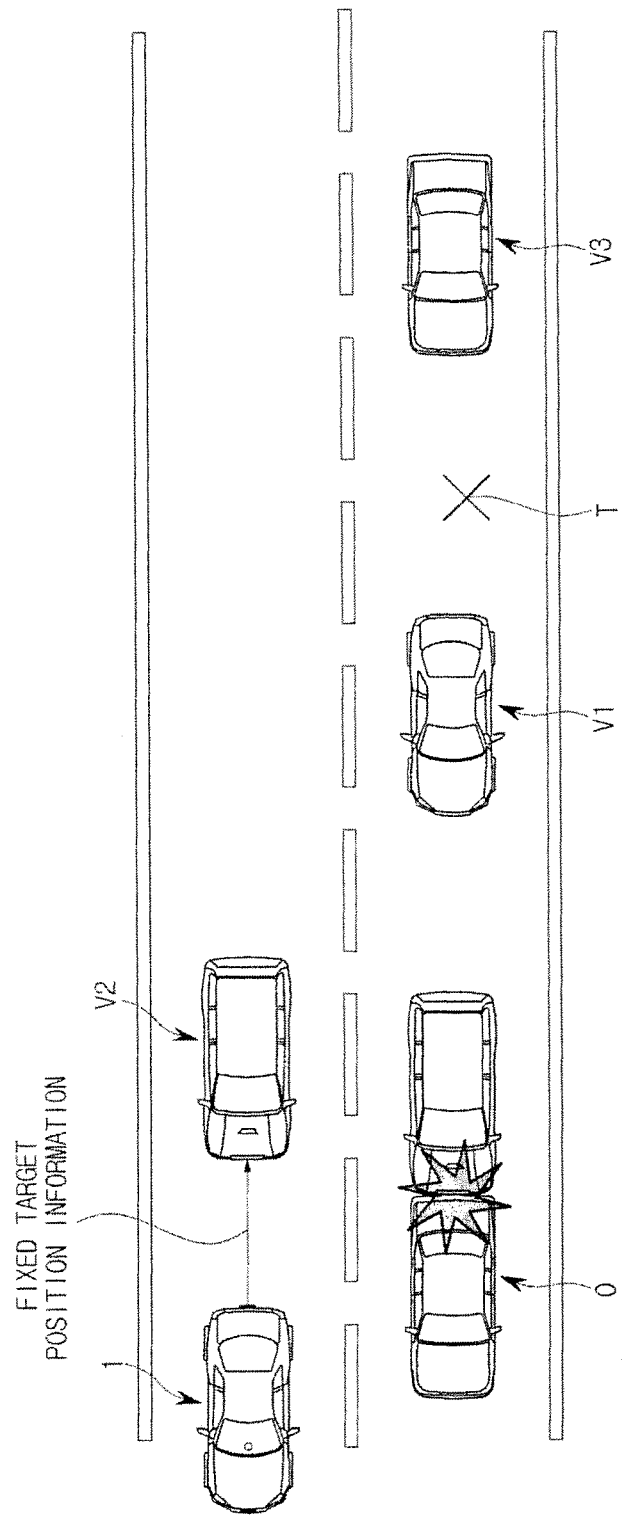

For example, as shown in FIG. 43, the vehicle 1 may request to the second vehicle V2 which is driven behind the vehicle 1 for the generation of the fixed target beam pattern, and transmit the position information on the fixed target T.

Figure 44:
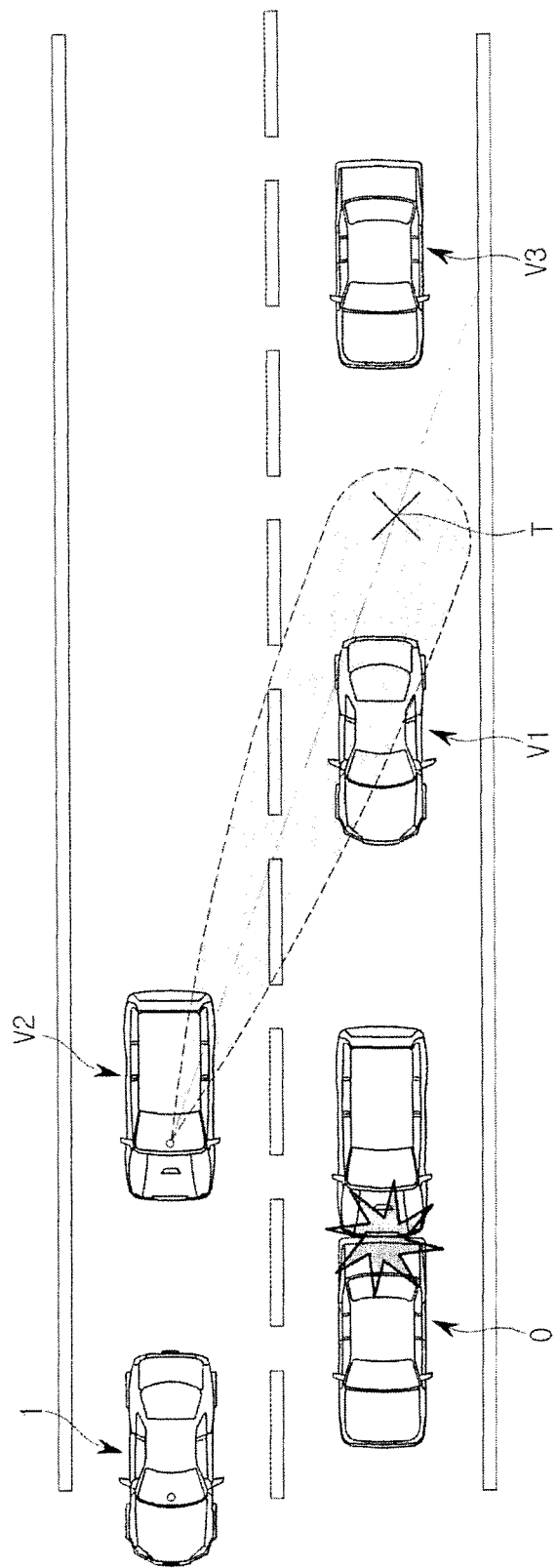

As shown in FIG. 44, the second vehicle V2 which receives the request for the generation of the fixed target beam pattern and the position information on the fixed target T may generate an eighth beam pattern BP8 formed toward the fixed target T. Further, the second vehicle V2 may transmit the presence of the driving obstacle O and the position information on the driving obstacle O through the eighth beam pattern BP8.

As such, since the second vehicle V2 generates the beam pattern formed toward the fixed target T and transmits the presence of the driving obstacle O and the position information on the driving obstacle O to the vehicle 1, the trailing vehicles may recognize the driving obstacle O located in front of the driving vehicle O, and confirm the position of the driving vehicle O.

As described above, the vehicle 1 may generate the beam pattern formed toward the fixed target in which the absolute position is fixed to provide the information on the driving obstacle O to the trailing vehicle V1.

In accordance with the aspects of the present invention, a vehicle including a wireless communication device for communicating with a peripheral vehicle, an external terminal, or a wireless communication base station, and a method of controlling the same can be provided.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A vehicle comprising:
   a wireless communication unit configured to form a direct beam pattern for performing direct wireless communication with a single target vehicle, and configured to form an omnidirectional beam pattern for performing wireless communication with at least two peripheral vehicles;
   a camera module configured to obtain an image of the at least one peripheral vehicle; and
   a display unit configured to display the obtained image, wherein,
   when the single target vehicle is selected, by a user, from the at least one peripheral vehicle based on the displayed image, the direct beam pattern is formed toward the selected single target vehicle, and
   when the single target vehicle is not selected, by the user, from the at least one peripheral vehicle based on the displayed image, the omnidirectional beam pattern is formed to communicate with the at least two peripheral vehicles,
   wherein the wireless communication unit comprises:
   a beam forming module configured to form the direct beam pattern and transceive a wireless signal through a radio wave of the direct beam pattern, and configured to form the omnidirectional beam pattern and transceive a wireless signal through a radio wave of the omnidirectional beam pattern; and
   a wireless communication control module configured to control the formation of the direct beam pattern according to a position of the single target vehicle, and
   wherein the wireless communication unit detects again the position of the single target vehicle when it is determined that the single target vehicle is deviated from the direct beam pattern.

2. The vehicle according to claim 1, wherein the beam forming module comprises:
   a plurality of phase converters configured to convert a phase of a modulation signal received from a signal conversion module; and
   an array antenna including a plurality of unit antennas and configured to transmit signals received from the plurality of phase converters to a free space.

3. The vehicle according to claim 2, wherein the wireless communication control module determines a main direction of the direct beam pattern according to the position of the single target vehicle, and determines a phase difference between the plurality of phase converters according to the determined main direction.

4. The vehicle according to claim 1, wherein the display unit includes a touch sensing display unit configured to detect a touch input of a driver, and the single target vehicle is selected according to the touch input of the driver.

5. The vehicle according to claim 1, further comprising a gaze detection device configured to detect a gaze of a driver, wherein the single target vehicle is selected according to the detected gaze of the driver.

6. The vehicle according to claim 1, further comprising an engine control system configured to control an operation of an engine, and detect a malfunction in the engine,
wherein the wireless communication unit transmits information on the malfunction in the engine received from the engine control system to the single target vehicle through a radio wave of the direct beam pattern.

7. The vehicle according to claim 1, further comprising a brake control apparatus configured to control a brake and detect a malfunction in the brake,
wherein the wireless communication unit transmits information on the malfunction in the brake received from the brake control apparatus to the single target vehicle through a radio wave of the direct beam pattern.

8. The vehicle according to claim 1, further comprising a driving subsystem configured to assist a driver with driving,
wherein the wireless communication unit transmits information on road conditions received from the driving subsystem to the single target vehicle through a radio wave of the direct beam pattern.

9. A vehicle comprising:
a wireless communication unit configured to form a direct beam pattern for performing direct wireless communication with a single target vehicle and configured to form an omnidirectional beam pattern for performing wireless communication with at least two peripheral vehicles;
a radar module configured to obtain position information of the at least one peripheral vehicle; and
a display unit configured to display the obtained position information,
wherein,
when the single target vehicle is selected, by a user, from the at least one peripheral vehicle based on the displayed position information, the direct beam pattern is formed toward the selected single target vehicle,
when the single target vehicle is not selected, by the user, from the at least one peripheral vehicle based on the displayed position information, the omnidirectional beam pattern is formed to communicate with the at least two peripheral vehicles,
wherein the wireless communication unit comprises:
a beam forming module configured to form the direct beam pattern and transceive a wireless signal through a radio wave of the direct beam pattern, and configured to form the omnidirectional beam pattern and transceive a wireless signal through a radio wave of the omnidirectional beam pattern; and
a wireless communication control module configured to control the formation of the direct beam pattern according to a position of the single target vehicle, and
wherein the wireless communication unit detects again the position of the single target vehicle when it is determined that the single target vehicle is deviated from the direct beam pattern.

10. The vehicle according to claim 9, wherein the beam forming module comprises:
a plurality of phase converters configured to convert a phase of a modulation signal received from a signal conversion module; and
an array antenna including a plurality of unit antennas and configured to transmit signals received from the plurality of phase converters to a free space.

11. The vehicle according to claim 10, wherein the wireless communication control module determines a main direction of the direct beam pattern according to the position of the single target vehicle, and determines a phase difference between the plurality of phase converters according to the determined main direction.

12. The vehicle according to claim 9, wherein the display unit includes a touch sensing display unit configured to detect a touch input of a driver, and
the single target vehicle is selected according to the touch input of the driver.

13. The vehicle according to claim 9, further comprising a gaze detection device configured to detect a gaze of a driver,
wherein the single target vehicle is selected according to the detected gaze of the driver.

14. A communication method of a vehicle, comprising:
receiving a selection of a single target vehicle by a user from at least one peripheral vehicle;
forming a direct beam pattern toward the single target vehicle;
communicating with the single target vehicle through a radio wave of the direct beam pattern; and
detecting again a position of the single target vehicle when it is determined that the single target vehicle is deviated from the direct beam pattern,
wherein the forming of the direct beam pattern toward the single target vehicle comprises:
determining a main direction of the direct beam pattern according to position information of the single target vehicle;
determining phase differences of wireless signals transmitted through a plurality of unit antennas based on the determined main direction;
transmitting the wireless signals through the plurality of unit antennas according to the determined phase differences, and
forming an omnidirectional beam pattern when the single target vehicle is not selected by the user from the at least one peripheral vehicle, and communicating with at least two peripheral vehicles through a radio wave of the omnidirectional beam pattern.

15. The communication method according to claim 14, wherein the receiving of the selection of the single target vehicle comprises:
obtaining an image of the at least one peripheral vehicle;
displaying the obtained image; and
determining the single target vehicle from the at least one peripheral vehicle based on the selection of the user and the displayed image.

16. The communication method according to claim 14, wherein the receiving of the selection of the single target vehicle comprises:
obtaining position information of the at least one peripheral vehicle;
displaying an image representing the position information of the at least one peripheral vehicle; and
determining the single target vehicle from the at least one peripheral vehicle based on the selection of the user and the displayed image.

17. A wireless communication device of a vehicle, comprising:
an internal communication unit configured to access a communication network of the vehicle;

a wireless communication unit configured to form a direct beam pattern and communicate with an external device through a radio wave of the direct beam pattern and configured to form an omnidirectional beam pattern and communicate with at least two external devices through a radio wave of the omnidirectional beam pattern; and a communication controller configured to control the wireless communication unit to form the direct beam pattern toward a single target vehicle when the single target vehicle is selected, by a user, from at least one peripheral vehicle and when an information transmission request and position information of the single target vehicle through the internal communication unit are received, the communication controller further configured to control the wireless communication unit to form the omnidirectional beam pattern when the single target vehicle is not selected, by the user, from the at least one peripheral vehicle, wherein the wireless communication unit comprises:

a beam forming module configured to form the direct beam pattern and transceive a wireless signal through the radio wave of the direct beam pattern, and configured to form the omnidirectional beam pattern and transceive a wireless signal through the radio wave of the omnidirectional beam pattern;

a signal conversion module configured to demodulate the wireless signal received through the beam forming module, and modulate a signal transmitted through the beam forming module; and a wireless communication control module configured to control the formation of the direct beam pattern according to a position of the single target vehicle, and wherein the wireless communication unit detects again the position of the single target vehicle when it is determined that the single target vehicle is deviated from the direct beam pattern.

18. The wireless communication device according to claim 17, wherein the beam forming module comprises:

a plurality of phase converters configured to convert a phase of the modulated signal received from the signal conversion module; and an array antenna including a plurality of unit antennas and configured to transmit signals received from the plurality of phase converters to a free space.

19. The wireless communication device according to claim 18, wherein the wireless communication control module determines a phase difference between the plurality of phase converters according to a main direction of the direct beam pattern.

* * * * *